(12) United States Patent
Chen et al.

(10) Patent No.: US 12,043,565 B2
(45) Date of Patent: Jul. 23, 2024

(54) METHODS FOR HEATING A METALLIC VESSEL IN A GLASS MAKING PROCESS

(71) Applicant: CORNING INCORPORATED, Corning, NY (US)

(72) Inventors: Ying Pin Chen, Hemei Township (TW); Megan Aurora DeLamielleure, Corning, NY (US); Dennis Eugene Hay, Folly Beach, SC (US); Chunhong Chelsie He, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 818 days.

(21) Appl. No.: 17/263,671

(22) PCT Filed: Jul. 11, 2019

(86) PCT No.: PCT/US2019/041313
§ 371 (c)(1),
(2) Date: Jan. 27, 2021

(87) PCT Pub. No.: WO2020/023218
PCT Pub. Date: Jan. 30, 2020

(65) Prior Publication Data
US 2021/0292212 A1 Sep. 23, 2021

Related U.S. Application Data

(60) Provisional application No. 62/703,907, filed on Jul. 27, 2018.

(51) Int. Cl.
*C03B 7/07* (2006.01)
*C03B 5/225* (2006.01)
*C03B 17/06* (2006.01)

(52) U.S. Cl.
CPC ............ *C03B 7/07* (2013.01); *C03B 5/225* (2013.01); *C03B 17/064* (2013.01)

(58) Field of Classification Search
None
See application file for complete search history.

(56) References Cited

U.S. PATENT DOCUMENTS

| 1,603,221 | A | | 10/1926 | Thomson | |
|---|---|---|---|---|---|
| 2,747,087 | A | * | 5/1956 | McArthur | ............ H03B 5/1835 331/93 |

(Continued)

FOREIGN PATENT DOCUMENTS

| CN | 1970476 A | 5/2007 |
|---|---|---|
| CN | 104445868 A | 3/2015 |

(Continued)

OTHER PUBLICATIONS

Japanese Patent Application No. 2021-504422, Office Action, dated Aug. 2, 2023, 8 pages (4 pages of English Translation and 4 pages of Original Copy); Japanese Patent Office.

(Continued)

*Primary Examiner* — Jodi C Franklin
(74) *Attorney, Agent, or Firm* — Kevin M. Able

(57) ABSTRACT

Methods for making a glass article are described that include flowing molten glass through a metallic vessel, and supplying alternating electrical currents to multiple electrical circuits, each electrical circuit including a power supply, a pair of adjacent electrical flanges connected to the power supply, and a portion of the metallic vessel extending between and in electrical communication with the pair of adjacent flanges. At least two adjacent electrical circuits of the multiple electrical circuits share an electrical flange that is a common electrical path for the two adjacent electrical circuits, the two adjacent electrical circuits being supplied with (Continued)

alternating electrical currents, wherein at least one of the electrical currents is cut by a phase-fired controller.

20 Claims, 14 Drawing Sheets

(56) References Cited

U.S. PATENT DOCUMENTS

| | | | |
|---|---|---|---|
| 2,761,890 A | | 9/1956 | Burthe |
| 2,926,208 A | | 2/1960 | Eden |
| 3,395,237 A | | 7/1968 | Orton |
| 3,400,204 A | | 9/1968 | Gell |
| 4,324,942 A | | 4/1982 | Williamson |
| 6,076,375 A | * | 6/2000 | Dembicki ............. C03B 17/025 222/593 |
| 6,286,337 B1 | * | 9/2001 | Palmquist ............. C03B 5/2252 65/157 |
| 7,430,880 B2 | * | 10/2008 | Butts .................... C03B 17/068 65/195 |
| 8,269,131 B2 | * | 9/2012 | Adelsberg ................ C03B 7/07 65/355 |
| 8,857,219 B2 | * | 10/2014 | De Angelis ............ C03B 7/098 65/355 |
| 9,242,886 B2 | | 1/2016 | Bergman et al. |
| 11,021,386 B2 | * | 6/2021 | Barnett .................... C03B 7/07 |
| 2008/0087046 A1 | * | 4/2008 | Hirabara ............... C03B 5/2252 219/67 |
| 2011/0204039 A1 | | 8/2011 | De Angelis et al. |
| 2013/0262057 A1 | | 10/2013 | Manouvrier |
| 2015/0240766 A1 | * | 8/2015 | Bolz .................... F02M 53/06 219/662 |
| 2017/0000339 A1 | | 1/2017 | Di Statsi et al. |
| 2017/0006652 A1 | | 1/2017 | Lee et al. |
| 2017/0305775 A1 | | 10/2017 | Claussen et al. |

FOREIGN PATENT DOCUMENTS

| | | |
|---|---|---|
| CN | 105645737 A | 6/2016 |
| CN | 105948462 A | 9/2016 |
| CN | 107646022 A | 1/2018 |
| CN | 206940721 U | 1/2018 |
| DE | 102004023726 A1 | 12/2005 |
| JP | 58-032030 A | 2/1983 |
| JP | 09-020521 A | 1/1997 |
| JP | 2003-306334 A | 10/2003 |
| JP | 2017-030987 A | 2/2017 |
| JP | 2017-178707 A | 10/2017 |
| JP | 6247958 B2 | 12/2017 |
| JP | 2018-052792 A | 4/2018 |
| JP | 2018-058756 A | 4/2018 |
| JP | 6340429 B2 | 6/2018 |
| KR | 2017-0003381 A | 1/2017 |
| WO | 2001/083389 A2 | 11/2001 |
| WO | 2012/132472 A1 | 10/2012 |
| WO | 2015/057646 A1 | 4/2015 |
| WO | 2017/035174 A1 | 3/2017 |

OTHER PUBLICATIONS

Chinese Patent Application No. 201980057593.6, Office Action, dated Jun. 14, 2022, 17 pages (09 pages of English Translation and 08 pages of Original Document), Chinese Patent Office.
Conference Record of the 1988 Industry Applications Society Annual Meeting (IEEE Cat. No. 88CH2565-0), 629-32 vol. 1, 1988; DOI: 10.1109/IAS.1988.25128; Conference: Conference 1988 Industry Applications Society Annual Meeting, Oct. 2-7, 1988, Pittsburgh, PA, USA; Sponsor: IEEE; Publisher: IEEE, New York, NY, USA.
International Search Report and Written Opinion of the International Searching Authority; PCT/US19/41313; Mailed Sep. 25, 2019; 11 Pages; European Patent Office.
Sarro et al., "A Scalable SCR Compact Model for ESD Circuit Simulation", IEEE Transactions on Electron Devices, vol. 57, No. 12, Dec. 2010, pp. 3275-3286.

* cited by examiner

METHODS FOR HEATING A METALLIC VESSEL IN A GLASS MAKING PROCESS

CROSS-REFERENCE TO RELATED APPLICATIONS

This application is a national stage application under 35 U.S.C. § 371 of International Application No. PCT/US2019/041313, filed on Jul. 11, 2019, which claims the benefit of priority of U.S. Provisional Application Ser. No. 62/703,907 filed on Jul. 27, 2018 the contents of which are relied upon and incorporated herein by reference in their entirety as if fully set forth below.

BACKGROUND

Field

The present disclosure relates to methods for heating a metallic vessel in a glass making process, and in particular using direct heating of the metallic vessel to control temperature and viscosity of molten glass in the metallic vessel.

Technical Background

The manufacturing of glass articles via a forming apparatus relies on controlling the viscosity of the molten glass as the molten glass travels between the source, e.g., a melting vessel, and the forming apparatus. In some manufacturing operations, the molten glass flows through refractory (e.g., ceramic) channels, wherein the refractory channels are heated indirectly by heating elements external to the channels to control the temperature of the molten glass. However, in other operations, such as during the manufacture of optical quality glass, for example the manufacture of display glass sheets for electronic visual display applications, the molten glass flows through metallic vessels, for example conduits and processing chambers, heated directly by an electrical current in walls of the vessels. It should be apparent that such heating on a commercial scale can involve significant electrical current provided to the vessels via electrical flanges joined to the vessels and in electrical communication with an electrical power source.

What is needed is a method for controlling the direct heating process that does not overheat and damage the flanges that carry the electrical current to the vessels.

SUMMARY

In accordance with the present disclosure, a method of forming a glass article is disclosed, comprising flowing molten glass through a metallic vessel, the metallic vessel comprising a plurality of electrical flanges attached to the metallic vessel, the plurality of electrical flanges comprising at least a first electrical flange, a second electrical flange spaced apart from the first electrical flange, and a third electrical flange spaced apart from the second electrical flange, the first electrical flange, the second electrical flange, and the third electrical flange arranged sequentially along a length of the metallic vessel, wherein the first electrical flange, the second electrical flange, and a first portion of the metallic vessel therebetween comprise a first electrical circuit, wherein the second electrical flange, the third electrical flange and a second portion of the metallic vessel between the second electrical flange and the third electrical flange comprise a second electrical circuit, and wherein the second electrical flange forms a common electrical path for the first electrical circuit and the second electrical circuit.

The method further comprises establishing a first alternating electrical current in the first electrical circuit and establishing a second alternating electrical current in the second electrical circuit with a first phase angle relative to the first alternating electrical current.

The method still further comprises controlling an electrical power dissipated in at least one of the first portion of the metallic vessel or the second portion of the metallic vessel by cutting at least one of the first alternating electrical current and the second alternating electrical current during each one-half cycle of the respective at least one first alternating electrical current and second alternating electrical current; and wherein a temperature of the second electrical flange is less than a temperature of the first portion and the second portion.

In embodiments, an absolute value of the first phase angle can be one of 0 degrees, 30 degrees, 60 degrees and 120 degrees.

In some embodiments, the metallic vessel comprises a fourth electrical flange spaced apart from and sequential to the first, second and third electrical flanges, the third electrical flange, the fourth electrical flange, and a third portion of the metallic vessel extending between the third electrical flange and the fourth electrical flange comprising a third electrical circuit, such that the third electrical flange provides a common electrical path for the second electrical circuit and the third electrical circuit, the method further comprising establishing a third alternating electrical current in the third electrical circuit with a second phase angle relative to the first alternating electrical current and a third phase angle relative to the second alternating electrical current.

An absolute value of the second phase angle can, in certain embodiments, be one of 0 degrees, 30 degrees, 60 degrees or 120 degrees.

In some embodiments, an absolute value of the second phase angle can be equal to an absolute value of the first phase angle.

In some embodiments, an absolute value of the third phase angle is one of 0 degrees, 30 degrees, 60 degrees or 120 degrees.

In various embodiments, an absolute value of the third phase angle can be equal to an absolute value of the first phase angle.

In some embodiments, the first and second phase angles can be non-zero, and a sign of the first phase angle can be different than a sign of the second phase angle. As used herein the term "sign" refers to a positive phase angle or a negative phase angle, relative to a reference phase.

The first alternating electrical current and the second alternating electrical current can be provided by a first transformer and a second transformer, respectively.

In embodiments, the third alternating electrical current is provided by a third transformer.

In some embodiments, any one or a combination of the first, second and/or third transformers can be delta-Y transformers (Δ-Y).

The cutting can comprise blocking the at least one of the first alternating electrical current and the second alternating electrical current during each one-half cycle of the respective at least one first alternating electrical current and second alternating electrical current with a phase-fired controller.

In some embodiments, the metallic vessel can comprise a fining chamber.

The method may further comprise supplying a forming body with the molten glass and drawing the molten glass from the forming body.

In some embodiments, the drawing comprises drawing the molten glass into a ribbon of glass.

In still other embodiments, a method of making glass is disclosed, comprising flowing a molten material through a metallic vessel, the metallic vessel comprising n electrical flanges attached to the metallic vessel along a length thereof, the n electrical flanges forming n−1 electrical circuits, each of the n−1 electrical circuits including two adjacent flanges of the n electrical flanges and a respective portion of the metallic vessel therebetween, wherein adjacent circuits of the n−1 electrical circuits include an electrical flange of the n electrical flanges that forms a common electrical path to the adjacent electrical circuits, and wherein n is equal to or greater than 3.

The method further comprises establishing an alternating electrical current in each electrical circuit of the n−1 electrical circuits.

The method still further comprises controlling a power dissipated in at least one portion of the metallic vessel comprising the n−1 electrical circuits by cutting the alternating electrical current supplied to the corresponding electrical circuit during each one-half cycle of the alternating electrical current in the corresponding electrical circuit, and wherein a temperature of each of the n electrical flanges is less than a temperature of the at least one portion.

In some embodiments, n can be equal to or greater than 4.

In some embodiments, an absolute value of a phase angle between at least two of the n−1 electrical currents can be one of 0 degrees, 30 degrees, 60 degrees, or 120 degrees.

The method may further comprise cutting the alternating electrical current supplied to each of the n−1 electrical circuits, such as with a phase-fired controller.

In some embodiments, the metallic vessel can comprise platinum. For example, in some embodiments, the metallic vessel can comprise a fining chamber.

In still another embodiment, an apparatus for forming a glass article is described, comprising a metallic vessel and n electrical flanges attached to the metallic vessel along a length thereof, the n electrical flanges comprising n−1 electrical circuits, each of the n−1 electrical circuits including two adjacent electrical flanges of the n electrical flanges, a respective portion of the metallic vessel connected between the two adjacent electrical flanges, and a power supply configured to supply an electrical current to the respective electrical circuit, wherein adjacent electrical circuits of the n−1 electrical circuits include an electrical flange of the n electrical flanges that forms a common electrical current path to the adjacent electrical circuits, and wherein the power supply of each electrical circuit of the n−1 electrical circuits comprises a transformer and a phase-fired controller.

In some embodiments, n is equal to or greater than 3.

In some embodiments, the phase-fired controller of each electrical circuit of the n−1 electrical circuits is connected to a primary coil of each respective transformer.

In various embodiments, the metallic vessel comprises a fining chamber.

Additional features and advantages of the embodiments disclosed herein will be set forth in the detailed description that follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
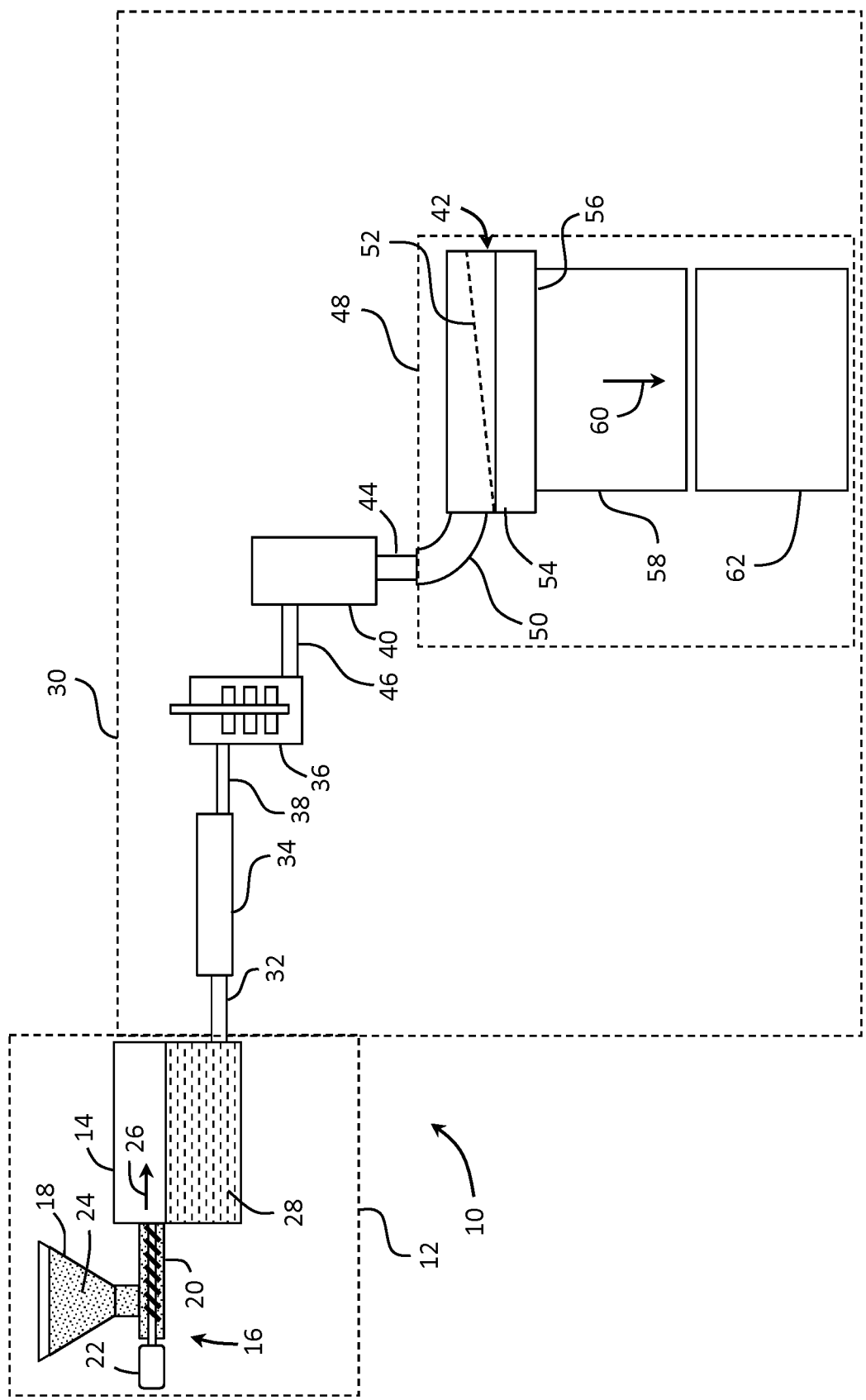
FIG. 1 is a schematic view of an exemplary glass manufacturing apparatus.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the term "metallic vessel" should be construed to include tanks, conduits, tubes or other structures formed from metal in which a molten glass may be contained or conveyed through.

As used herein, the terms "comprising" and "including", and variations thereof, shall be construed as synonymous and open-ended, unless otherwise indicated.

Shown in FIG. 1 is an exemplary glass manufacturing apparatus 10. In some embodiments, the glass manufacturing apparatus 10 can comprise a glass melting furnace 12 including a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting vessel 14 may be an electrically-boosted melting vessel, wherein energy is added to the raw material through both combustion burners and by direct heating, wherein an electrical current is passed through the raw material, the electrical current thereby adding energy via Joule heating of the raw material.

In further embodiments, glass melting furnace 12 can include thermal management devices (e.g., insulation components) that reduce heat loss from the melting vessel. In still further embodiments, glass melting furnace 12 can include electronic and/or electromechanical devices that facilitate melting of the raw material into a glass melt. Still further, glass melting furnace 12 can include support structures (e.g., support chassis, support member, etc.) or other components.

Melting vessel 14 is typically formed from a refractory material, such as a refractory ceramic material, for example a refractory ceramic material comprising alumina or zirconia, although the refractory ceramic material can comprise other refractory materials, such as yttrium (e.g., yttria, yttria stabilized zirconia, yttrium phosphate), zircon ($ZrSiO_4$) or alumina-zirconia-silica or even chrome oxide, used either alternatively or in any combination. In some examples, melting vessel 14 may be constructed from refractory ceramic bricks.

In some embodiments, glass melting furnace 12 can be incorporated as a component of a glass manufacturing apparatus configured to fabricate a glass article, for example a glass ribbon of an indeterminate length, although in further embodiments, the glass manufacturing apparatus can be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be included in a glass manufacturing apparatus comprising a slot draw apparatus, a float bath apparatus, a down-draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down-draw glass manufacturing apparatus 10 for fusion drawing a glass ribbon for subsequent processing into individual glass sheets or rolling the glass ribbon onto a spool.

Glass manufacturing apparatus 10 (e.g., fusion down draw apparatus 10) can optionally include an upstream glass manufacturing apparatus 16 positioned upstream of melting vessel 14. In some examples, a portion of, or the entire upstream glass manufacturing apparatus 16, can be incorporated as part of the glass melting furnace 12.

As shown in the embodiment illustrated in FIG. 1, upstream glass manufacturing apparatus 16 can include a raw material storage bin 18, a raw material delivery device 20 and a motor 22 connected to raw material delivery device 20. Raw material storage bin 18 can be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 to deliver a predetermined amount of raw material 24 from storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as various "sands". Raw material 24 can also include scrap glass (i.e. cullet) from previous melting and/or forming operations. Combustion burners are typically used to begin the melting process. In an electrically boosted melting process, once the electrical resistance of the raw material is sufficiently reduced, electric boost is begun by developing an electrical potential between electrodes positioned in contact with the raw material, thereby establishing an electrical current through the raw material, the raw material typically entering, or in, a molten state at this time.

Glass manufacturing apparatus 10 can also optionally include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, can be incorporated as part of the glass melting furnace 12. Elements of downstream glass manufacturing apparatus 30, including first connecting conduit 32, may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals for forming downstream components of the glass manufacturing apparatus can include molybdenum, rhenium, tantalum, titanium, tungsten and alloys thereof.

Downstream glass manufacturing apparatus 30 can include a first conditioning (i.e. processing) chamber, such as fining chamber 34, located downstream from melting vessel 14 and coupled to melting vessel 14 by way of the above-referenced first connecting conduit 32. In some examples, molten glass 28 may be gravity fed from melting vessel 14 to fining chamber 34 by way of first connecting conduit 32. For instance, gravity may drive molten glass 28 through an interior pathway of first connecting conduit 32 from melting vessel 14 to fining chamber 34. It should be understood, however, that other conditioning chambers may be positioned downstream of melting vessel 14, for example between melting vessel 14 and fining chamber 34. In some embodiments, a conditioning chamber can be employed between the melting vessel and the fining chamber wherein molten glass from a primary melting vessel is further heated in a secondary vessel to continue the melting process or cooled to a temperature lower than the temperature of the molten glass in the primary melting vessel before entering the fining chamber.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although the use of arsenic and antimony may be discouraged for environmental reasons in some applications. Fining chamber 34 is heated to a temperature greater than the melting vessel temperature, thereby heating the fining agent. Oxygen bubbles produced by the temperature-induced chemical reduction of one or more fining agents included in the melt rise through the molten glass within the fining chamber, wherein gases in the molten glass produced in the melting furnace can coalesce or diffuse into the oxygen bubbles produced by the fining agent. The enlarged gas bubbles with increased buoyancy can then rise to a free surface of the molten glass within the fining chamber and thereafter be vented out of the fining chamber. The oxygen bubbles can further induce mechanical mixing of the molten glass in the fining chamber as they rise through the molten glass.

The downstream glass manufacturing apparatus 30 can further include another conditioning chamber, such as mixing apparatus 36, for example a stirring chamber, for mixing the molten glass that flows downstream from fining chamber 34. Mixing apparatus 36 can be used to provide a homogenous glass melt composition, thereby reducing chemical or thermal inhomogeneities that may otherwise exist within the molten glass exiting the fining chamber. As shown, fining chamber 34 may be coupled to mixing apparatus 36 by way of a second connecting conduit 38. In some embodiments, molten glass 28 can be gravity fed from the fining chamber 34 to mixing apparatus 36 by way of second connecting conduit 38. For instance, gravity may drive molten glass 28 through an interior pathway of second connecting conduit 38 from fining chamber 34 to mixing apparatus 36. Typically, the molten glass within mixing apparatus 36 includes a free surface, with a free volume extending between the free surface and a top of the mixing apparatus. It should be noted that while mixing apparatus 36 is shown downstream of fining chamber 34 relative to a flow direction of the molten glass, mixing apparatus 36 may be positioned upstream from fining chamber 34 in other embodiments. In some embodiments, downstream glass manufacturing apparatus 30 may include multiple mixing apparatus, for example a mixing apparatus upstream from fining chamber 34 and a mixing apparatus downstream from fining chamber 34. These multiple mixing apparatus may be of the same design, or they may be of a different design from one another. In some embodiments, one or more of the vessels and/or conduits can include static mixing vanes positioned therein to promote mixing and subsequent homogenization of the molten material.

Downstream glass manufacturing apparatus 30 can further include another conditioning chamber such as delivery vessel 40 located downstream from mixing apparatus 36. Delivery vessel 40 can condition molten glass 28 to be fed into a downstream forming device. For instance, delivery vessel 40 can act as an accumulator and/or flow controller to adjust and provide a consistent flow of molten glass 28 to forming body 42 by way of exit conduit 44. The molten glass within delivery vessel 40 can, in some embodiments, include a free surface, wherein a free volume extends upward from the free surface to a top of the delivery chamber. As shown, mixing apparatus 36 can be coupled to delivery vessel 40 by way of third connecting conduit 46. In some examples, molten glass 28 can be gravity fed from mixing apparatus 36 to delivery vessel 40 by way of third connecting conduit 46. For instance, gravity can drive molten glass 28 through an interior pathway of third connecting conduit 46 from mixing apparatus 36 to delivery vessel 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down-draw glass making apparatus can comprise a trough 52 positioned in an upper surface of the forming body, and converging forming surfaces 54 (only one surface shown) that converge in a draw direction along a bottom edge (root) 56 of the forming body. Molten glass delivered to forming body trough 52 via delivery vessel 40, exit conduit 44 and inlet conduit 50 overflows the walls of trough 52 and descends along the converging forming surfaces 54 as separate flows of molten glass. The separate flows of molten glass join below and along the root 56 to produce a single ribbon 58 of molten glass that is drawn in a draw direction 60 from root 56 by applying a downward tension to the glass ribbon, such as by gravity, and pulling roll assemblies, to control the dimensions of the glass ribbon as the molten glass cools and a viscosity of the material increases. Accordingly, glass ribbon 58 goes through a visco-elastic transition and acquires mechanical properties that give glass ribbon 58 stable dimensional characteristics. Glass ribbon 58 may in some embodiments be separated into individual glass sheets 62 by a glass separation apparatus (not shown) in an elastic region of the glass ribbon, while in further embodiments, the glass ribbon may be wound onto spools and stored for further processing.

The metallic vessels of downstream glass manufacturing apparatus 30, including first connecting conduit 32, fining chamber 34, mixing apparatus 36, second connecting conduit 38, delivery vessel 40, exit conduit 44, and inlet conduit 50, can be heated indirectly, for example by electrical resistance heating elements positioned proximate the metallic vessel(s). However, in many instances such heating is performed by establishing an electrical current in the metallic vessel itself, for example in a wall of the metallic vessel in contact with the molten glass therein, wherein the metallic vessel wall is heated by Joule heating. As used herein, such Joule heating of metallic vessels is termed direct heating.

Figure 2:
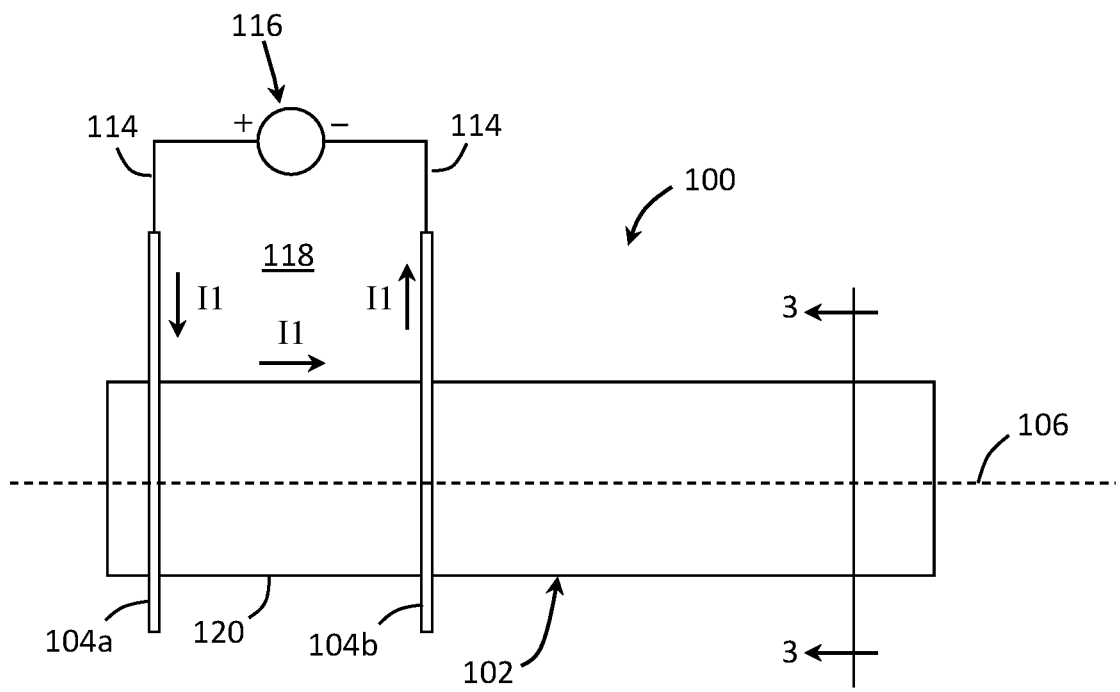
FIG. 2 is a side view of a portion of an exemplary glass making apparatus showing a metallic vessel, such as a metallic vessel of FIG. 1, configured for direct heating exemplary.
Figure 3:
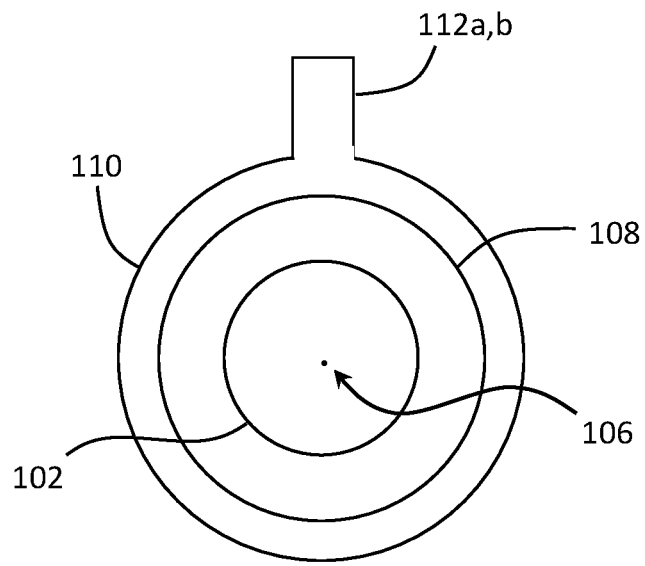
FIG. 3 is a front view of an exemplary electrical flange, such as an electrical flange from FIG. 2.

FIGS. 2 and 3 are a cross-sectional view and an end view, respectively, of a portion of an exemplary direct heated delivery apparatus 100 comprising metallic vessel 102 configured for direct heating. Metallic vessel 102 typically comprises a heat and corrosion-resistant material. For example, metallic vessel 102 can comprise platinum, iridium, rhodium, osmium, ruthenium and palladium, or alloys thereof. For example, the metallic vessel may be formed from a platinum-rhodium alloy including from about 70% to about 90% by weight platinum and about 10% to about 30% by weight rhodium. However, other suitable metals for forming the metallic vessel can include molybdenum, rhenium, tantalum, titanium, tungsten, and alloys thereof. Moreover, although metallic vessel 102 is shown comprising a circular cross-sectional shape orthogonal to longitudinal axis 106, metallic vessel 102 may comprise a non-circular cross-sectional shape, such as an elliptical cross-sectional shape or an oval cross-sectional shape, or any other cross-sectional shape suitable for conveying molten glass.

Direct heated delivery apparatus 100 further comprises a first electrical flange 104a and a second electrical flange 104b attached to metallic vessel 102, for example by welding. First electrical flange 104a and second electrical flange 104b, in various embodiments, can extend around an entire circumference of metallic vessel 102 and can include one or more rings, although in further embodiments, first and second electrical flanges 104a and 104b, respectively, can be configured to extend around only a portion of the circumference of metallic vessel 102. In the embodiment shown in FIG. 3, first and second electrical flanges 104a and 104b comprise at least two rings: an innermost ring 108 and an outermost ring 110. Because of its proximity to the hot metallic vessel 102, innermost ring 108 can, in some embodiments, be formed from the same or similar metal as the metallic vessel to which it's attached. For example, in the instance where metallic vessel 102 is formed from a platinum-rhodium alloy, innermost ring 108 can also be formed from the same or similar platinum-rhodium alloy. On the other hand, outermost ring 110 may be formed with a lower-cost, less heat tolerant metal, such as nickel or alloys thereof. In some embodiments, electrical flanges 104a and/or 104b can comprise more than two rings, for example intermediate rings positioned between innermost ring 108 and outermost ring 110. It should be noted, however, that in other embodiments, first and/or second electrical flanges 104a and 104b can be formed as a single ring, or in some cases as a simple tab attached to metallic vessel 102.

Electrical flanges 104a and 104b may further include electrode portions 112a and 112b, respectively, extending therefrom, that provide connection points for electrical cables 114 (and/or bus bars) carrying electrical current I1 to (and from) first electrical flange 104a and second electrical flange 104b. Additionally, in some embodiments, first and second electrical flanges 104a and 104b may include a cooling tube (not shown) attached to an outer perimeter of the electrical flanges, for example around an outer perimeter of outermost ring 110, the cooling tube comprising a passage through which a cooling fluid is flowed. In some embodiments the cooling fluid can be a gas, for example air, while in other embodiments, the cooling fluid can be a liquid, for example water, or even a combination of gas and liquid.

As shown in FIG. 2, first and second electrical flanges 104a and 104b are in electrical communication with electrical power supply 116 that supplies electrical power (e.g., electrical current) to electrical circuit 118 formed by electrical power supply 116, electrical cables 114, first and second electrical flanges 104a and 104b, and portion 120 of metallic vessel 102 extending between first and second electrical flanges 104a and 104b and in electrical communication therewith. Together, electrical power supply 116, first and second electrical flanges 104a and 104b, and portion 120 of metallic vessel 102 extending between first and second electrical flanges 104a and 104b (as well as the cabling 112 and electrode portions 112a, 112b connecting first and second electrical flanges 104a, 104b to electrical power supply 116) comprise electrical circuit 118. Electrical current I1 provided by electrical power supply 116 can be a direct electrical current (DC), wherein electrical charge flow occurs in a single direction, or an alternating electrical current (AC), wherein electrical charge flow is cyclic and reverses each one-half cycle.

Figure 4A:
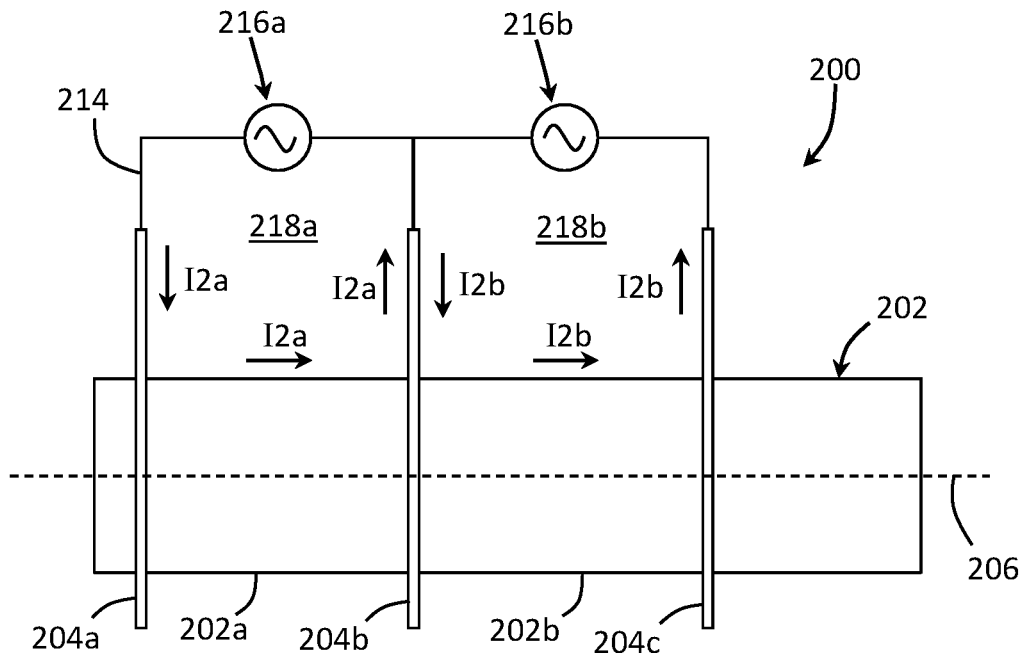
FIG. 4A is another side view of a portion of an exemplary glass making apparatus comprising two adjacent electrical circuits used to heat portions of the metallic vessel.

FIG. 4A illustrates another embodiment of an exemplary direct heated delivery apparatus 200 comprising metallic vessel 202 configured for direct heating. The direct heated delivery apparatus 200 is like the direct heated delivery apparatus 100, except that direct heated delivery apparatus 200 is provided with a second electrical circuit.

In accordance with FIG. 4A, metallic vessel 202 comprises a heat and corrosion-resistant material. For example, as described previously in respect of metallic vessel 102, metallic vessel 202 can comprise platinum, iridium, rhodium, osmium, ruthenium and palladium, or alloys thereof. For example, the metallic vessel may be formed from a platinum-rhodium alloy including from about 70% to about 90% by weight platinum and about 10% to about 30% by weight rhodium. However, other suitable metals for forming the metallic vessel can include molybdenum, rhenium, tantalum, titanium, tungsten, and alloys thereof. Moreover, although metallic vessel 202 is shown comprising a circular cross-sectional shape orthogonal to longitudinal axis 206, metallic vessel 202 can comprise a non-circular cross-sectional shape, such as an elliptical cross-sectional shape, an oval cross-sectional shape, or any other cross-sectional shape suitable to convey molten glass.

Direct heated delivery apparatus 200 further comprises a first electrical flange 204a and a second electrical flange 204b attached to metallic vessel 202, for example by welding. First electrical flange 204a and second electrical flange 204b, in various embodiments, can extend around an entire circumference of metallic vessel 202 and can include one or more rings, although in further embodiments, first and second electrical flanges 204a and 204b can extend around only a portion of the circumference of metallic vessel 202. It should be noted, however, that in other embodiments, first and/or second electrical flanges 204a, 204b can be formed as a single ring, or as a simple tab attached to metallic vessel 202. The structure and composition of electrical flanges 204a and 204b can be similar or identical to the structure and composition of first and second electrical flanges 104a and 104b.

As further shown in FIG. 4A, first and second electrical flanges 204a and 204b are in electrical communication with an electrical power supply 216a that supplies electrical power (e.g., electrical current) to first electrical circuit 218a formed by electrical power supply 216a, cabling 214, electrical flanges 204a and 204b, and first portion 202a of metallic vessel 202 extending between first and second electrical flanges 204a and 204b and in electrical communication therewith. Together, first electrical power supply 216a, first electrical flange 204a and second electrical flange 204b, and first portion 202a of metallic vessel 202 extending between first and second electrical flanges 204a, 204b (as well as the associated cabling 214 connecting first and second electrical flanges 204a, 204b to electrical power supply 216a) comprise first electrical circuit 218a. Electrical current I2a provided by first electrical power supply 216a is an alternating electrical current (AC) power supply, wherein charge flow is cyclic (e.g., sinusoidal) and reverses polarity each one-half cycle.

Figure 4B:
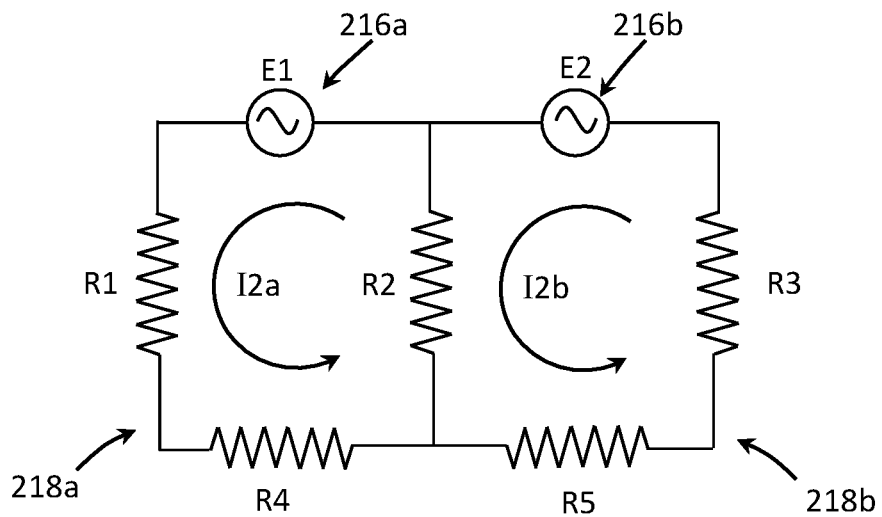
FIG. 4B is an equivalent circuit diagram of the two adjacent circuits of FIG. 4A.

In addition, direct heated delivery apparatus 200 further comprises second electrical circuit 218b comprising a second electrical power supply 216b. Second electrical circuit 218b comprises second electrical flange 204b and third electrical flange 204c connected to metallic vessel 202, spaced apart from second flange 204b, and arranged sequentially from first electrical flange 204a and second electrical flange 204b, and a second portion 202b of metallic vessel 202 extending between second electrical flange 204b and third electrical flange 204c and in electrical communication therewith. Second electrical power supply 216b supplies second electrical current I2b to second electrical circuit 218b. It should be noted, however, that unlike the embodiment of FIG. 2, wherein second electrical flange 104b carried only first electrical current I1, in the present embodiment, second electrical flange 204b is common to both first electrical circuit 218a and second electrical circuit 218b and carries current from both first and second electrical circuits 218a and 218b. The resultant total electrical current in the common electrical path through electrical flange 204b is the difference of electrical currents I2a and I2b (I2a−I2b). FIG. 4B is an equivalent representation of the embodiment of FIG. 4A, wherein R1, R2, and R3 represent the resistances of electrical flanges 204a, 204b and 204c, respectively, R4 and R5 represent the resistances of first metallic vessel portion 202a and second metallic vessel portion 202b, respectively, and E1 and E2 represent the voltages across the electrical power supplies 216a and 216b, respectively (the resistance of any intervening cabling is omitted). The solution to determining the current through R2 via superposition should be clear to those skilled in the art and can be summarized as follows.

Figure 4C:
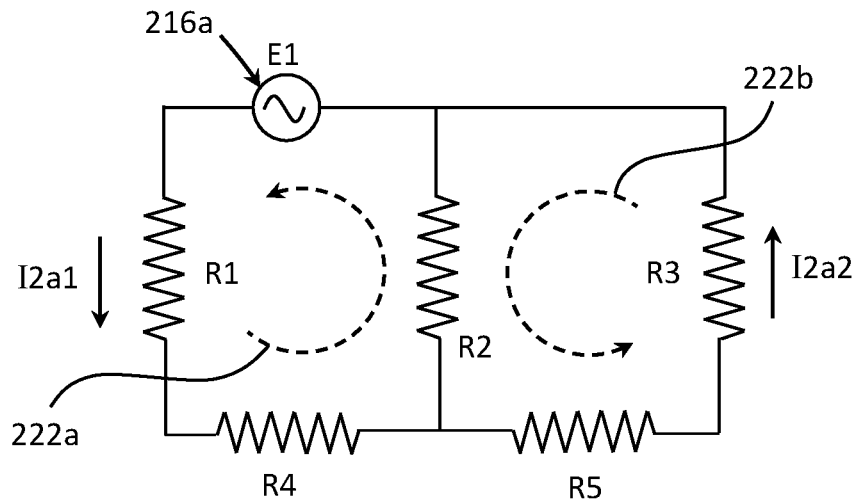
FIGS. 4C and 4D illustrate how superposition can be used to determine the current in a common electrical flange.

In accordance with FIG. 4C, power supply 216b is replaced by a short circuit to form a single network with two interior loops, loop 222a and loop 222b, and three branches (R1 and R4, R2, and R3 and R5) and wherein the voltages around first and second loops 222a and 222b can be represented by, respectively, $$(R1+R4+R2) \cdot I2a1 - R2 \cdot I2a2 = E1, (R2+R3+R5) \cdot I2a2 - R2 \cdot I2a1 = 0, \qquad (1)$$

where I2a1 is the electrical current in first loop 222a and I2a2 is the electrical current in second loop 222b, both electrical currents I2a1 and I2a2 due to power supply 216a. As used herein, a branch is any subnetwork connected to the rest of a larger network at two terminals only, and a loop is a closed path traced along a sequence of branches. (A third external loop containing R1, R4, R5 and R3 is unnecessary to the current discussion and not considered here.)

Figure 4D:
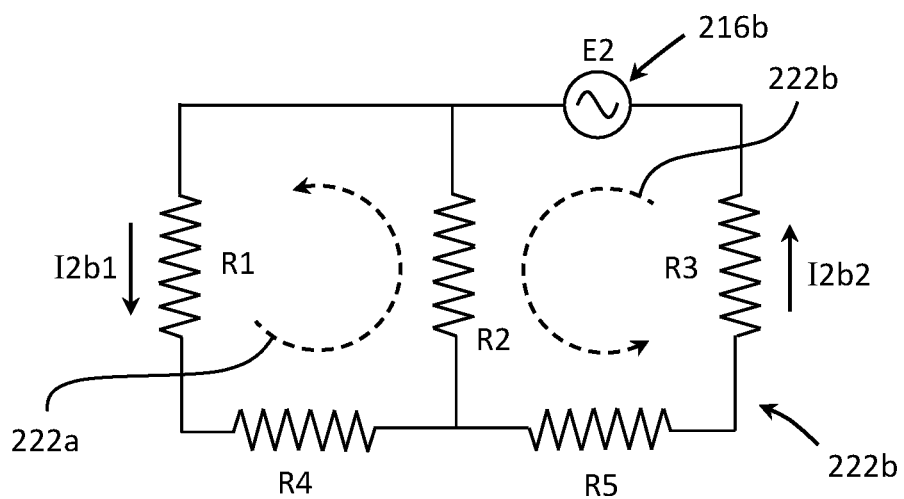

In accordance with FIG. 4D, in a next step power supply 216a is replaced by a short circuit and second power source 216b is reinstated. The voltages in first and second loops 222a and 222b can then be represented by, respectively, $$(R1+R4+R2)\cdot I2b1-R2\cdot I2b2=0, (R2+R5+R3)\cdot I2b2-R2\cdot I2b1=E2, \quad (2)$$

wherein I2b1, the electrical current in first loop 222a, and I2b2, the electrical current in second loop 222b, are due to power supply 216b.

Alternatively, from FIG. 4B, the voltages in first and second circuits 218a and 218b can be more simply represented by, $$(R1+R2+R4)\cdot I1-R2\cdot I2=E1, (R2+R5+R3)\cdot I2-R2\cdot I1=E2. \quad (3)$$

Equations (1) and (2), or alternatively equation (3), show that for two adjacent circuits sharing a common electrical path (e.g., a common electrical flange), each circuit powered by its own electrical power supply, the electrical current in the common electrical path is the difference of the electrical currents in the individual circuits through the common path, based on the electrical currents in the circuits supplied by the electrical power supplies, considered individually. It should be clear that as the number of adjacent electrical circuits is increased, calculating the electrical current in each common electrical flange becomes increasingly more complicated, as the electrical current supplied by each power supply effects every other electrical circuit in electrical communication with that power supply. More practically, changes in any one circuit affect every other connected circuit.

In accordance with the basic design of FIG. 4A, n electrical flanges can result in n−1 electrical circuits, wherein each electrical circuit comprises an electrical power supply, two adjacent electrical flanges, and a portion of the metallic vessel to be heated. The portions of the metallic vessel extending between adjacent electrical flanges represent individual heating zones heated by the associated electrical circuit. By varying the electrical current supplied to the plurality of electrical flanges, a different heating power can be applied to each portion of the metallic vessel (e.g., each heating zone), and therefore different temperatures attained for each portion. This heating scheme can be used to control viscosity of the molten glass flowing through the metallic vessel.

The electrical power supplied to a typical manufacturing facility is provided from a commercial utility grid and comprises an alternating electrical current system delivering three voltage (and current) phases separated by a phase angle of 120 degrees. Generically, an individual voltage phase can be represented by the equation, $$E\cdot\sin(\omega t+\phi), \quad (5)$$

where E is the magnitude of the voltage waveform, $\omega t=\theta$ is the angular frequency in radians/second and $\phi$ is the phase angle. For a three-phase system as described herein, equation 5 can be rendered for the three phases as, $$V1(\theta)=E1\cdot\sin(\theta) \quad (6)$$

$$V2(\theta)=E2\cdot\sin(\theta-120), \text{ and} \quad (7)$$

$$V3(\theta)=E3\cdot\sin(\theta-240)=E3\cdot\sin(\theta+120), \quad (8)$$

wherein V1(θ), V2(θ) and V3(θ) represent the instantaneous voltage as a function of angular frequency and phase angle, and E1, E2 and E3 represent the peak phase voltage. For a balanced system, E1=E2=E3. As shown, voltage V2 is out of phase with voltage V1 by minus 120 degrees (the phase angle between voltage V1 and V2 is 120 degrees, or the voltage V2 lags the voltage V1 by 120 degrees), and voltage V3 is out of phase with voltage V1 by minus 240 degrees (the phase angle between voltages V1 and V3 is a negative 240 degrees and the phase angle between voltages V2 and V3 is a negative 120 degrees, or voltage V3 lags both voltages V1 and V2). One of ordinary skill in the art will readily appreciate that the electrical current in each electrical circuit will display the same sine-dependent waveform as the voltage.

It should further be apparent to those of ordinary skill in the art that by reversing polarity of the three phases (equivalent to a phase shift of 180 degrees), additional phases can be obtained. For example, $$V4=-V1=-E1\cdot\sin(\theta)=a\sin(\theta-180) \quad (9)$$

$$V5=-V2=-E2\cdot\sin(\theta-120-180)=E2\cdot\sin(\theta-300)=E2\cdot\sin(\theta+60) \quad (10)$$

$$V6=-V3=-E3\cdot\sin(\theta-240)=E3\cdot\sin(\theta-240-180)=E3\cdot\sin(\theta-60). \quad (11)$$

Thus, six voltage phases separated by a phase angle of 60 degrees are obtainable from a three-phase power system, and similarly six current phases also separated by a phase angle of 60 degrees.

A significant portion of the load placed on the electrical supply to an electrically-heated (e.g., electrically boosted) glass manufacturing facility comes from the melting process and direct heating of the various metallic vessels used to convey and/or process the molten glass from the melting vessel to the forming body. Efficient use of the supplied electrical power can be obtained by direct heating of the metallic vessels utilizing multiphase power with cut-waveform power management as described below.

Figure 5:
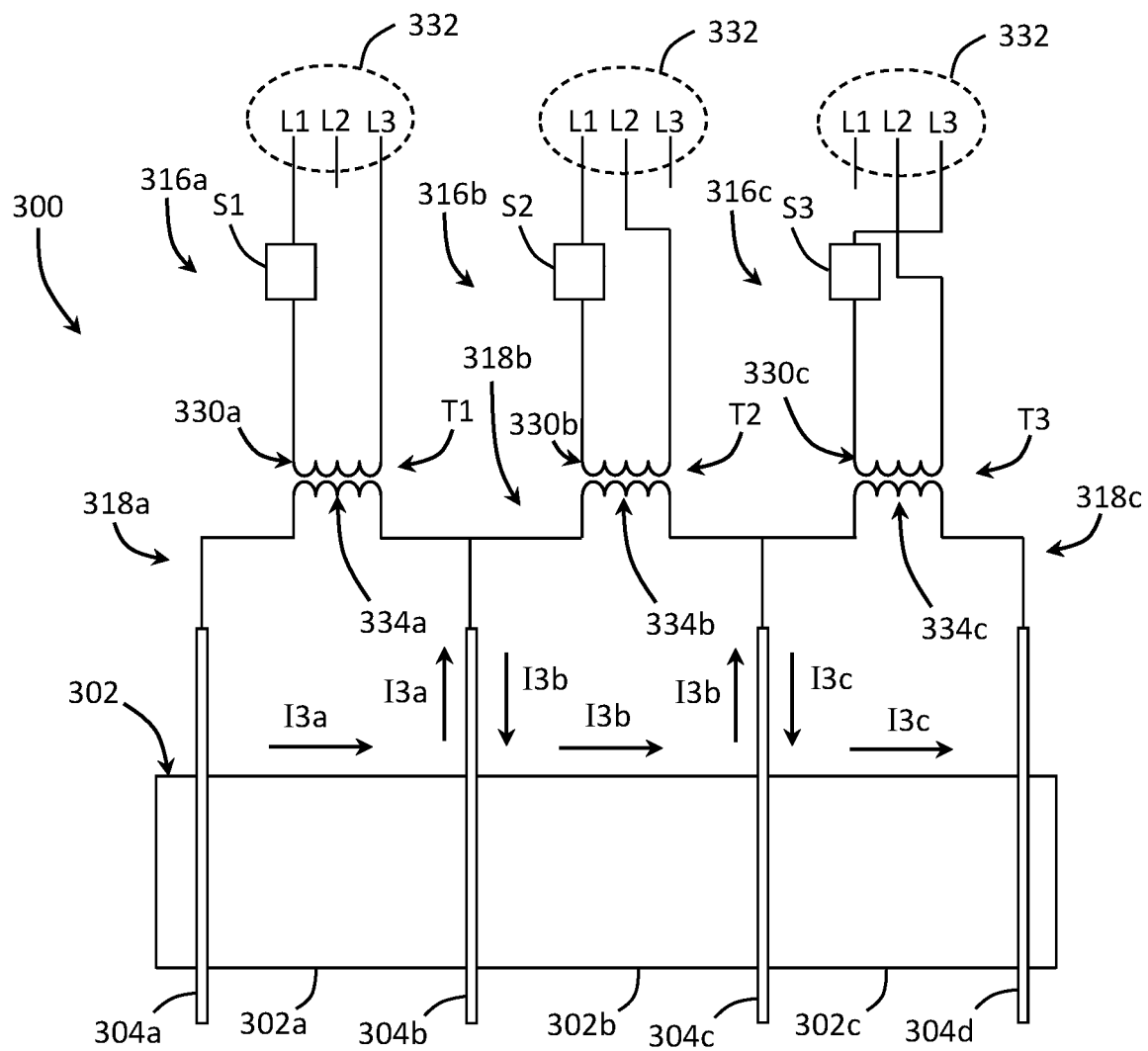
FIG. 5 is a schematic view of a portion of an exemplary glass making apparatus comprising a metallic vessel with three adjacent electrical circuits.

FIG. 5 illustrates a portion of an exemplary direct heated molten glass delivery apparatus 300 comprising metallic vessel 302 and a plurality of electrical flanges attached to and in electrical communication with metallic vessel 302. In the embodiment depicted in FIG. 5, four electrical flanges, i.e., 304a, 304b, 304c, and 304d, are shown arranged sequentially along a length of metallic vessel 302, although in further embodiments the number of electrical flanges can be as many as needed to heat the metallic vessel, e.g., to produce the desired number of heating zones. For example, in further embodiments, the number of electrical flanges can be five electrical flanges, six electrical flanges, seven electrical flanges, or even more electrical flanges depending on the length of metallic vessel 302 and the number of heating zones. Moreover, metallic vessel 302 is not limited to a single vessel but may include multiple vessels in electrical communication with each other and forming a flow path for molten glass flowing therethrough. Of particular interest in direct heated molten glass delivery apparatus is heating between the melting vessel and the mixing apparatus, and more particularly first connecting conduit 32, fining chamber 34 and optionally second connecting conduit 38. As described briefly above, fining chamber 34 is used to heat the molten glass to a temperature greater than a temperature of the molten glass in melting vessel 14. The increased temperature causes fining agents in molten glass 28 to release oxygen gas that paradoxically aids in the removal of gases released into the molten glass during chemical reactions that occur in the melting vessel and gases that might be trapped in or by the raw material. To achieve proper fining, an increase in the temperature of the molten glass begins in first connecting conduit 32 so that molten glass 28 has reached a first fining temperature by the time it reaches fining chamber 34. As the molten glass leaves fining chamber 34 via second connecting conduit 38, the molten glass is cooled at a controlled rate. In addition to first connecting conduit 32 and second connecting conduit 38, the fining chamber itself may further comprise several temperature zones heated by direct heating to control the molten glass temperature, and hence its viscosity, through the fining chamber. Accordingly, rather than a single electrical circuit extending between first connecting conduit 32 and the downstream end of fining chamber 34, or optionally the downstream end of second connecting conduit 38, these components can be heated using several interconnected circuits, wherein the electrical current through the various circuits is controlled to obtain a desired temperature in each of the heating zones formed by the interconnected circuits. Thus, metallic vessel 302 can comprise any one or more of connecting conduits 32, 38, 46 and/or fining chamber 34, mixing apparatus 36, delivery vessel 40, exit conduit 44, or inlet conduit 50, in various combinations.

Moreover, as described above, n electrical flanges can be arranged into n−1 electrical circuits, each electrical circuit of the n−1 electrical circuits comprising two adjacent electrical flanges, portions of the metallic vessel 302 connected therebetween, and an electrical power source electrically coupled to each pair of adjacent electrical flanges.

Accordingly, direct heated molten glass delivery apparatus 300 further comprises three electrical circuits: first electrical circuit 318a, second electrical circuit 318b, and third electrical circuit 318c. First electrical circuit 318a comprises first electrical flange 304a, second electrical flange 304b, and a first portion 302a of metallic vessel 302 extending between and in electrical communication with first and second electrical flanges 304a and 304b.

First electrical circuit 318a further comprises a first alternating current electrical power supply 316a, which, in the embodiment of FIG. 5A comprises a first transformer T1. Primary coil 330a of transformer T1 is connected between line L1 and line L3 of three-phase power supply 332. Three-phase power supply 332 can comprise, for example, three-phase power supplied to the glass manufacturing facility by a local utility company. Additionally, while FIG. 5A depicts primary coil 330a connected between L1 and L3, primary coil 330a could be coupled between any other two lines of three-phase power supply 332, such as between lines L1 and L2, or between lines L2 and L3. Transformer T1 further comprises a secondary coil 334a electromagnetically coupled to primary coil 330a. Transformer T1 isolates first electrical circuit 312a from the three-phase power supply 332. Transformer T1 is also a step-down transformer that converts the high line voltage between lines L1 and L3 to a lower voltage and simultaneously increasing the current. Additionally, transformer T1 provides for voltage phase reversal (180-degree phase shift) if desired by reversing the secondary coil leads, and may further provide different phase voltage (and current) by connecting to different taps.

First alternating electrical power supply 316a further comprises a phase-fired controller S1 electrically coupled between primary coil 330a and line L1, although in further embodiments, S1 could be electrically coupled between primary coil 330a and line L3. In still further embodiments, phase-fired controller S1 could be electrically coupled to secondary coil 334a. A phase-fired controller begins conducting at a predetermined phase angle of the applied waveform, then conducts until the waveform reaches zero. For example, phase-fired controller S1 may comprise one or more thyristors (e.g., silicon-controlled rectifiers), one thyristor for each one-half cycle of the waveform.

Direct heated molten glass delivery apparatus 300 further comprises second electrical circuit 318b. Second electrical circuit 318b comprises second electrical flange 304b, third electrical flange 304c, and a second portion 302b of metallic vessel 302 extending between and in electrical communication with second electrical flange 304b and third electrical flange 304c.

Second electrical circuit 318b further comprises a second alternating current electrical power supply 316b, which, in the embodiment of FIG. 5A, is a second transformer T2. A primary coil 330b of transformer T2 is connected between line L1 and line L2 of three-phase power supply 332. Additionally, while FIG. 5A depicts primary coil 330b connected between lines L1 and L2, primary coil 330b could be coupled between any other two lines of three-phase power supply 332, such as between lines L1 and L3, or between lines L2 and L3. Transformer T2 further comprises a secondary coil 334b electromagnetically coupled to primary coil 330b. Transformer T2 isolates second electrical circuit 318b from three-phase power supply 332. However, transformer T2 is also a step-down transformer that converts the high line voltage between lines L1 and L2 to a low voltage with high current. Additionally, transformer T2 provides for voltage phase reversal capability.

Second alternating electrical power supply 316b further comprises a phase-fired controller S2 electrically coupled between primary coil 330b and line L1, although in further embodiments, S2 could be electrically coupled between primary coil 330b and line L2. In still further embodiments, phase-fired controller S2 could be electrically coupled to secondary coil 334b. Like phase-fired controller S1, phase-fired controller S2 conducts only during a predetermined phase angle range of the applied electrical current waveform.

Direct heated molten glass delivery apparatus 300 further comprises third electrical circuit 318c. Third electrical circuit 318c comprises third electrical flange 304c, fourth electrical flange 304d, and a third portion 302c of metallic vessel 302 extending between and in electrical communication with third electrical flange 304c and fourth electrical flange 304d.

Third electrical circuit 318c further comprises a third alternating current electrical power supply 316c, which, in the embodiment of FIG. 5A is a third transformer T3. A primary coil 330c of transformer T3 is connected between line L2 and line L3 of three phase power supply 332. Additionally, while FIG. 5A depicts primary coil 330c connected between lines L2 and L3, primary coil 330c could be coupled between any other two lines of three phase power supply 332, such as between lines L1 and L3, or between lines L1 and L2. Transformer T3 further comprises a secondary coil 334c electromagnetically coupled to primary coil 330c. Accordingly, transformer T3 isolates third electrical circuit 318b from three phase power supply 332, such as for safety reasons. However, transformer T3 is also a step-down transformer that converts the high line voltage between lines L2 and L3 to a low voltage supply with high current. Additionally, transformer T3 provides for voltage phase reversal capability.

Third alternating current electrical power supply 316c further comprises phase-fired controller S3 electrically coupled between primary coil 330c and line L3, although in further embodiments, S3 could be electrically coupled between primary coil 330c and line L2. In still further embodiments, phase-fired controller S3 could be electrically coupled to secondary coil 334c. Like phase-fired controllers S1 and S2, phase-fired controller S3 conducts only during a predetermined phase angle range of the applied waveform.

Like the embodiment of FIG. 4A-4D, the arrangement of FIG. 5 includes common electrical paths, e.g., second electrical flange 304b provides a common electrical path to both first electrical circuit 318a and second electrical circuit 318b. Third electrical flange 304c is common to both second electrical circuit 318b and third electrical circuit 318c. Accordingly, second electrical flange 304b carries both first electrical current I3a and second electrical current I3b, and third electrical flange 302c carries both second electrical current I3b and third electrical current I3c. The total electrical current carried by second electrical flange 304b is the difference between electrical currents I3a and I3b, and the total electrical current carried by third electrical flange 304c is the difference between second electrical current I3b and third electrical current I3c.

Figure 6:
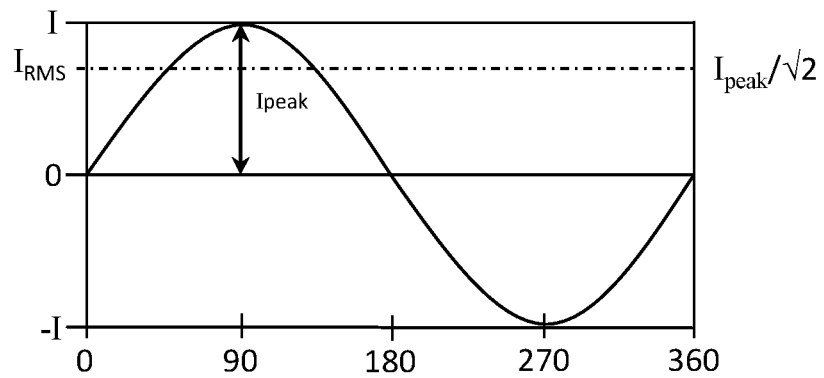
FIG. 6 is a graph showing an exemplary sinusoidal alternating electrical current waveform.

To better understand the effect of a phase-fired controller as described herein, first consider FIG. 6 illustrating an exemplary sinusoidal current waveform. Current I varies sinusoidally over an angular range of 360 degrees, and has a peak magnitude that ranges from +Ipeak at 90 degrees to −Ipeak at 270 degrees. The waveform has a zero crossing at 180 degrees, a peak-to-peak magnitude of 2·|Ipeak|, and is represented by the equation $I(\theta)=I_{peak}\cdot\sin(\theta)$. Typically, one is interested in the equivalent constant value current in the conductor rather than the instantaneous value, for example the root mean square (RMS) value of the current. The RMS value of the current is easily calculated as the peak value of the current divided by the square root of 2, i.e., $I_{peak}/\sqrt{2}$.

Figure 7A:
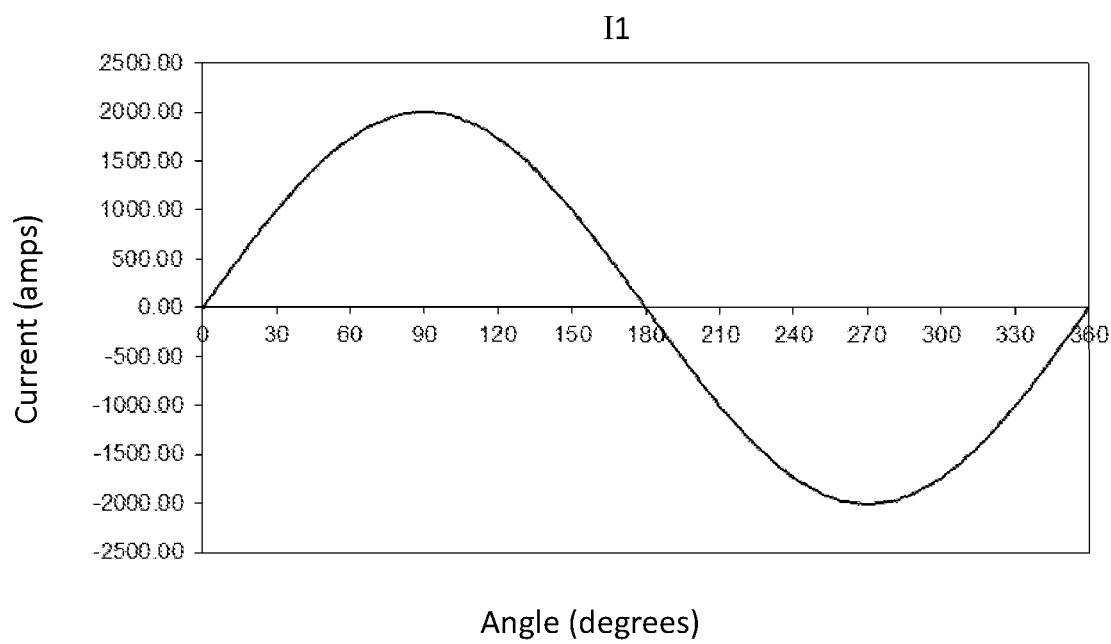
FIG. 7A is a graph of a baseline sinusoidal alternating electrical current waveform.
Figure 7B:
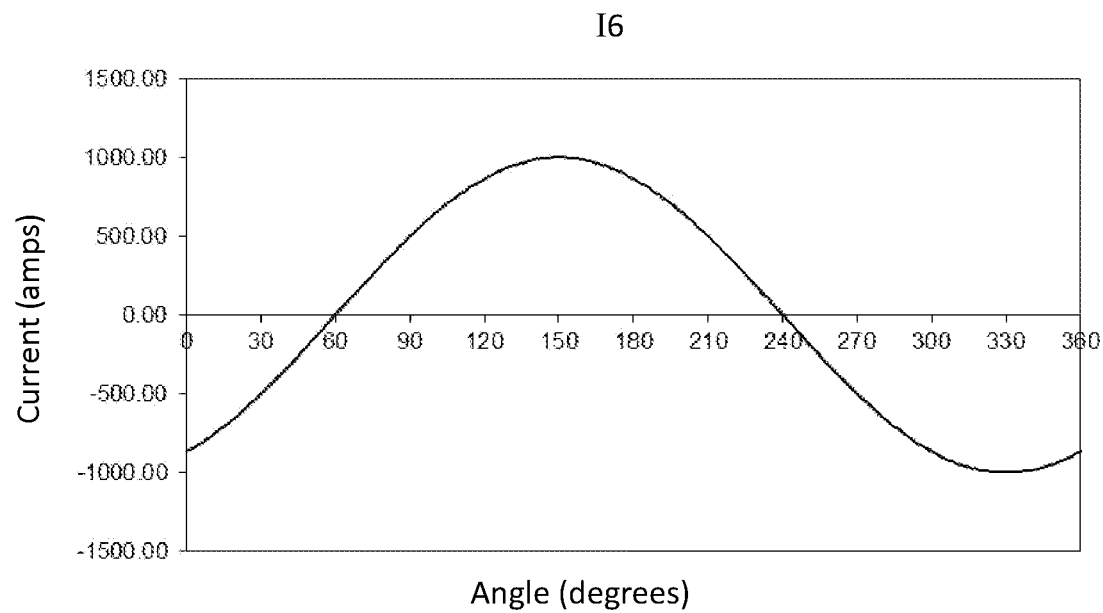
FIG. 7B is a graph of a sinusoidal alternating electrical current waveform that lags the sinusoidal alternating electrical current waveform of FIG. 7A.
Figure 7C:
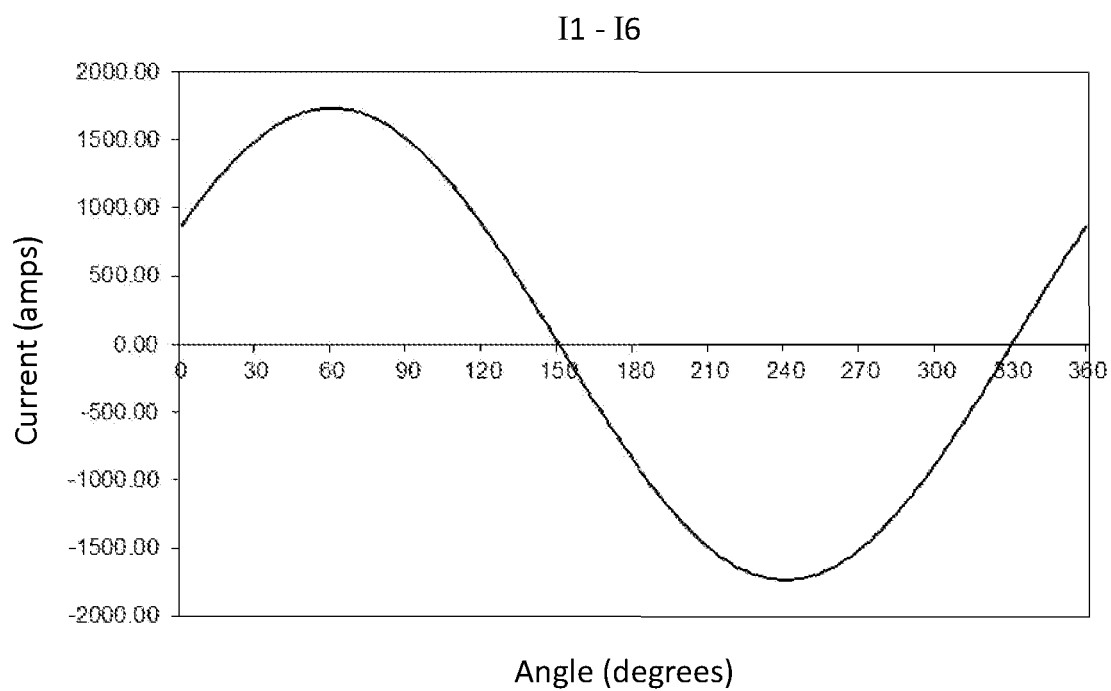
FIG. 7C is a graph showing the resultant alternating electrical current waveform when the alternating electrical current waveform of FIG. 7A and the alternating electrical current waveform of FIG. 7B are present in the same conductor, such as a common electrical flange.

Now consider FIGS. 7A and 7B illustrating two sinusoidal waveforms representing two electrical current phases I1 and I6 existing in an electrical conductor, for example the common electrical flange 204b in FIG. 4A, wherein the phase of I1 is equivalent to the phase of V1, equation (6) (expressed as a current rather than a voltage), and the phase of I6 is equivalent to the phase of V6, equation (11). I6, shown in FIG. 7B, is 60 degrees out of phase with I1, shown in FIG. 7A (I6 lags I1 by 60 degrees). For discussion and not limitation, I1 is assumed to have a peak value of 2,000 amperes (amps) and therefore an RMS value of 1414 amps. I6 is assumed to have a peak value of 1,000 amps and therefore an RMS value of 707 amps. The resultant current in the common conductor is the difference of the two electrical currents from FIGS. 7A and 7B and is shown in FIG. 7C. The resultant current I1-I6 has a peak value of 1,732 amps and an RMS value of 1,225 amps. It is important to note that the resultant current waveform is also sinusoidal.

Figure 7D:
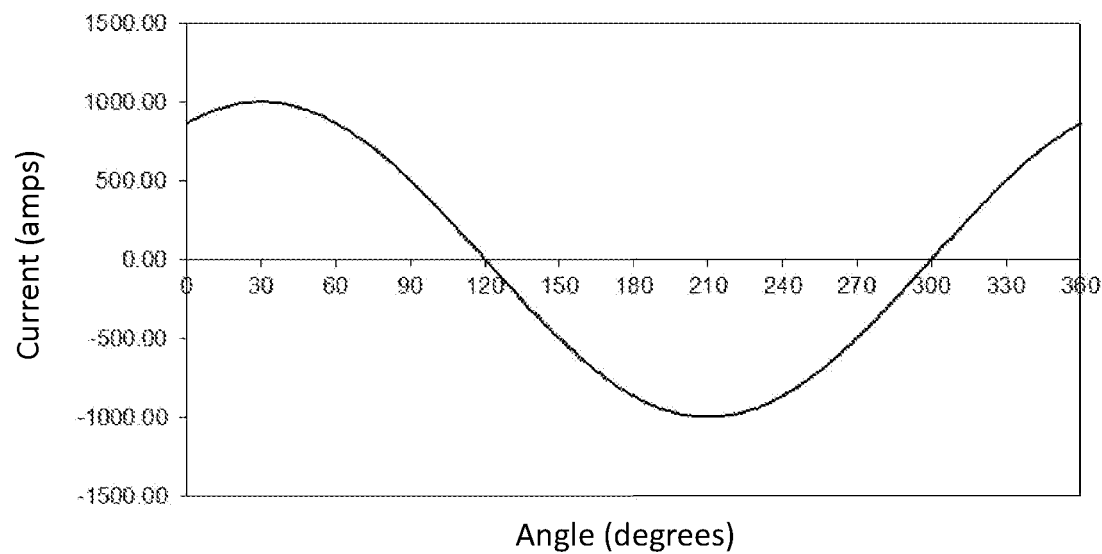
FIG. 7D a graph of a sinusoidal alternating electrical current waveform that leads the sinusoidal alternating electrical current waveform of FIG. 7A by the same phase angle that the sinusoidal alternating electrical current waveform of FIG. 7B lags the sinusoidal alternating electrical current waveform of FIG. 7A.
Figure 7E:
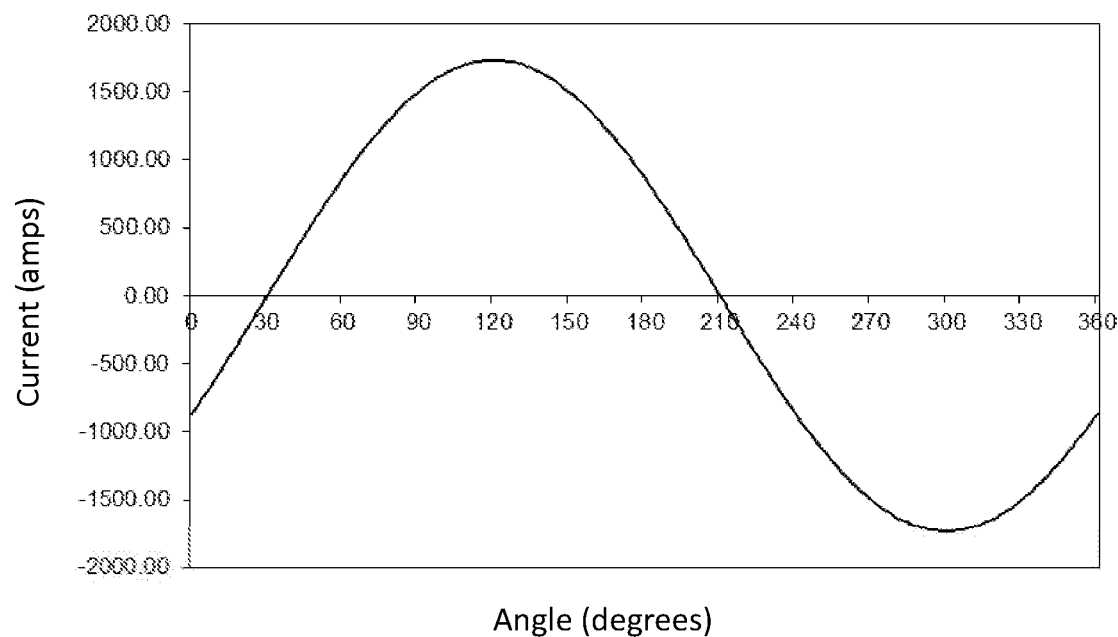
FIG. 7E is a graph showing the resultant alternating electrical current waveform when the alternating electrical current waveform of FIG. 7A and the alternating electrical current waveform of FIG. 7D are present in the same conductor, such as a common electrical flange.

Consider now another example wherein FIG. 7D illustrates a third current I5 equivalent in phase to V5 (equation 10). Like I6, I5 has a peak value of 1,000 amps and therefore an RMS value of 707 amps. However, instead of lagging, I5 leads I1 (FIG. 7A) by 60 degrees. Substituting I5 for I6, the resultant current I1-I5 is shown in FIG. 7E and has a peak value of 1,732 amps and an RMS value of 1,225 amps, identical to the resultant current of FIG. 7C. Comparing FIG. 7C and FIG. 7E, it should be clear that although the phase of the resultant current I1-I5 is different from that of FIG. 7C, the electrical current amplitude is not. That is, the electrical current in the common conductor (e.g., common electrical flange 204b) is the same regardless whether the second electrical current is lagging (I6) or leading (I5) I1. This is not the case when the waveform is non-sinusoidal.

Figure 8A:
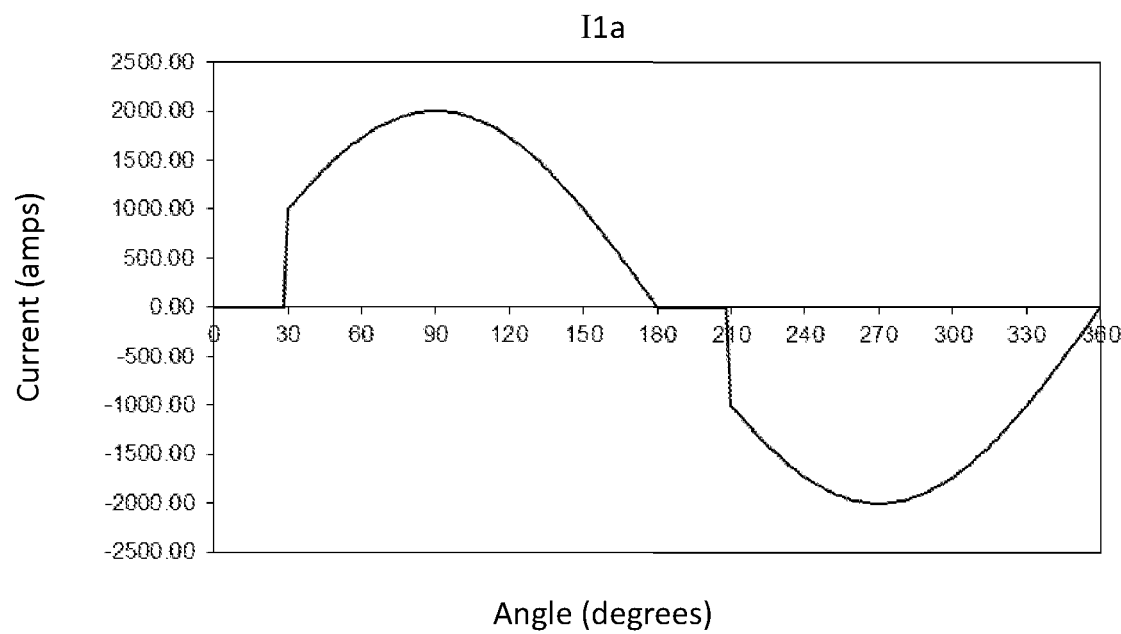
FIG. 8A is a graph of a baseline cut alternating electrical current waveform.

FIG. 8A depicts a first electrical current waveform I1a in a conductor like the waveform of FIG. 7A, but with a portion of a predetermined half cycle of the waveform cut. That is, the current in FIG. 8A is an otherwise sinusoidal waveform with a portion blocked, making the overall waveform non-sinusoidal. In FIG. 8A, the leading portion of both the positive and the negative half cycles of I1a are cut (between 0 and 30 degrees and between 180 degrees and 210 degrees). While the peak value of I1a is still assumed to be 2,000 amps, as for the case of FIG. 7A, the RMS value of I1a is no longer $I/\sqrt{2}$. To obtain the RMS value of I1a, instantaneous values of I1a must be determined, taken for example at every degree of angular frequency, and the RMS value calculated as the square root of the mean value of the squares of the instantaneous values. In this instance, the RMS value of I1a is 1,396 amps, less than the 1,414 RMS value of I1 from the purely sinusoidal waveform of FIG. 7A. It can be appreciated, then, that waveform cutting can be an effective method of controlling electrical current, and hence power.

Figure 8B:
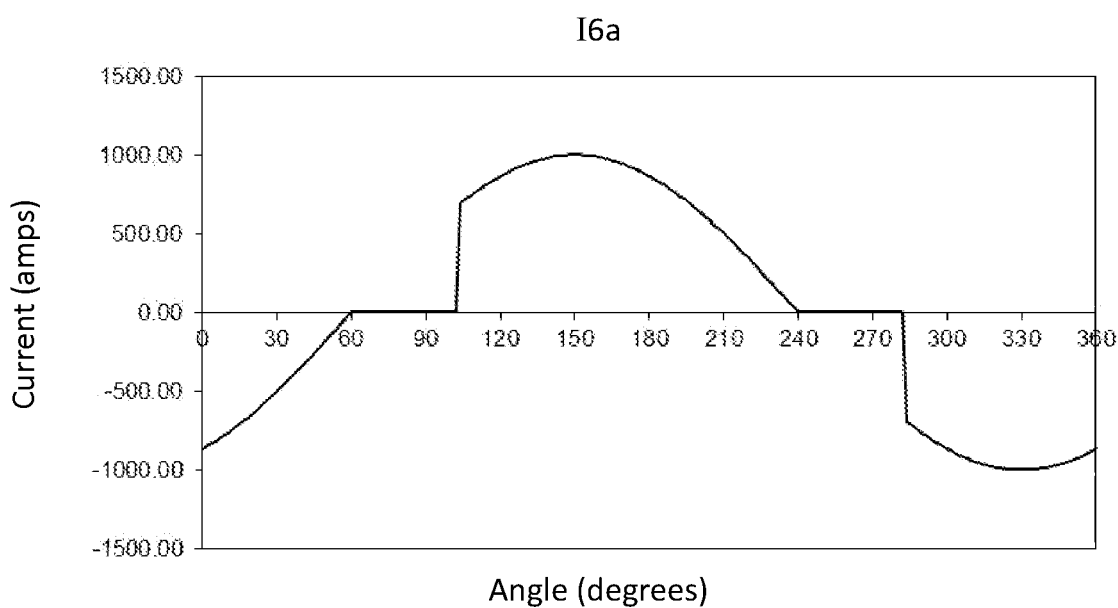
FIG. 8B is a graph of a cut alternating electrical current waveform that lags the sinusoidal alternating electrical current waveform of FIG. 8A.
Figure 8C:
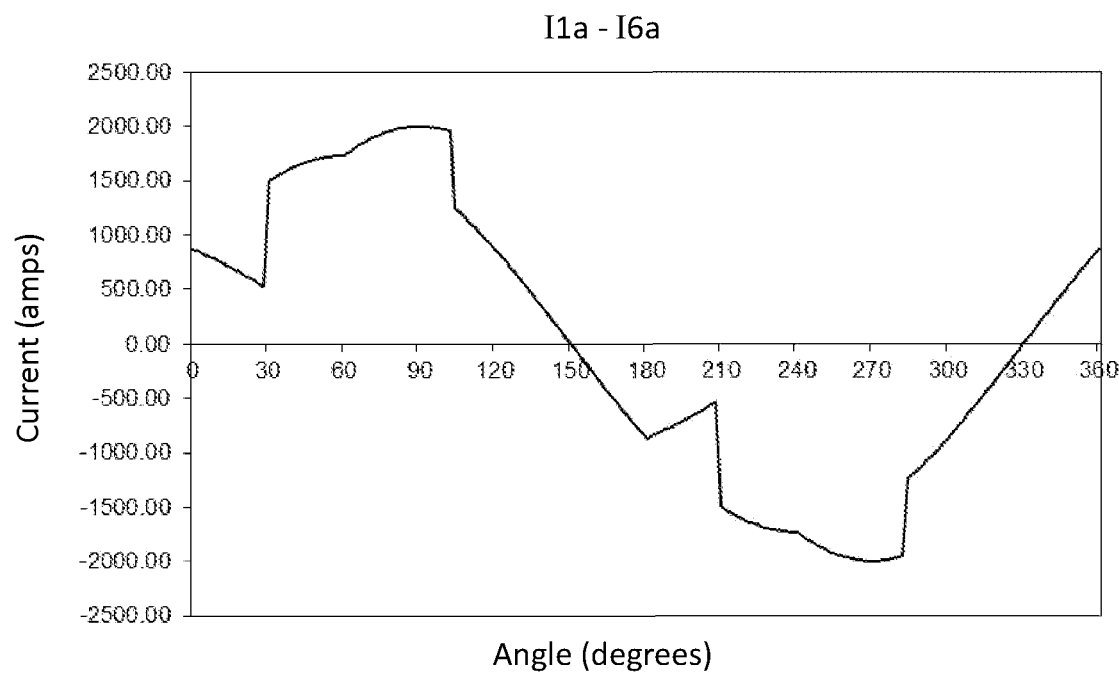
FIG. 8C is a graph showing the resultant alternating electrical current waveform when the cut alternating electrical current waveform of FIG. 8A and the alternating electrical current waveform of FIG. 8B are present in the same conductor, such as a common electrical flange.
Figure 8D:
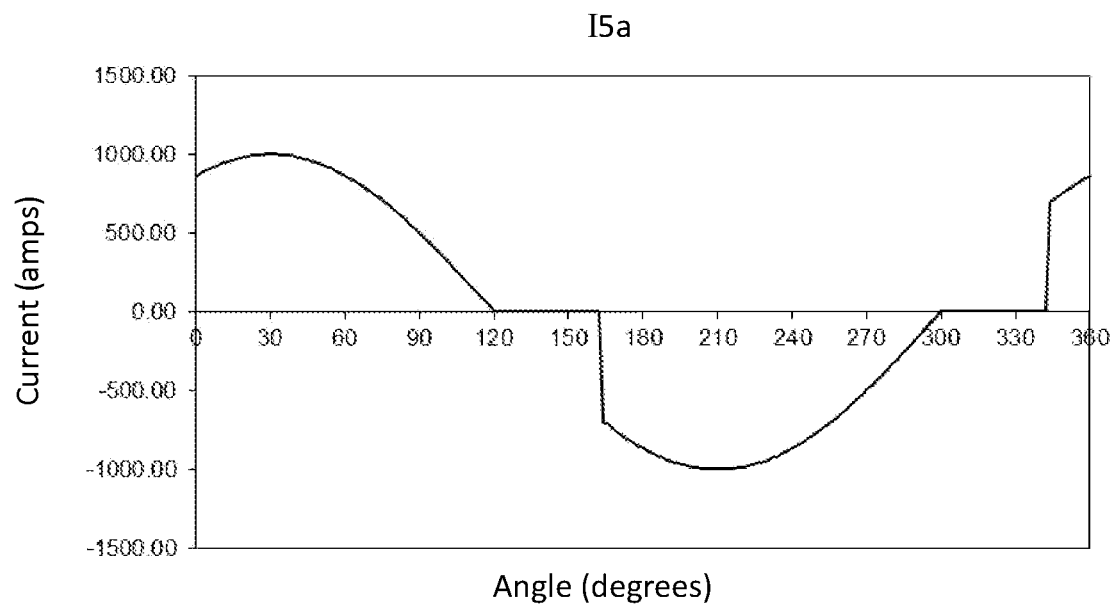
FIG. 8D a graph of a cut alternating electrical current waveform that leads the cut alternating electrical current waveform of FIG. 8A by the same phase angle that the cut alternating electrical current waveform of FIG. 8B lags the cut alternating electrical current waveform of FIG. 8A.
Figure 8E:
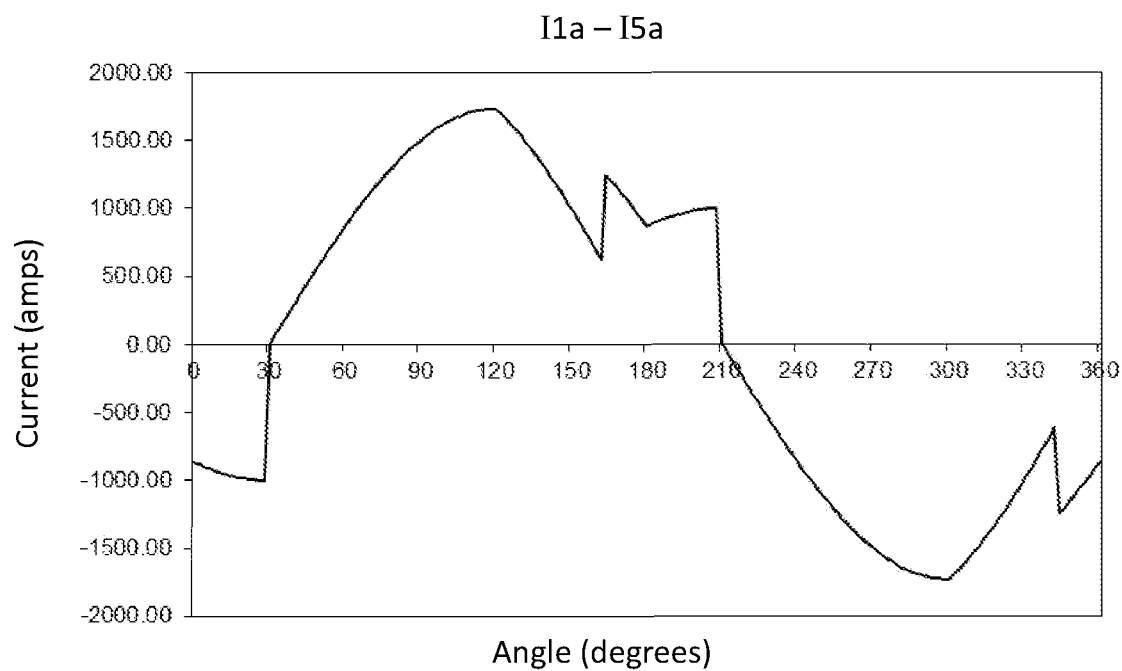
FIG. 8E is a graph showing the resultant alternating electrical current waveform when the cut alternating electrical current waveform of FIG. 8A and the alternating electrical current waveform of FIG. 8D are present in the same conductor, such as a common electrical flange.

FIG. 8B is a schematic illustration of I6a like I6 of FIG. 7B, but I6a has been cut during the leading 45 degrees of each positive and negative half cycle. I6a again has a peak value of 1,000 amps, as in FIG. 7B, but the RMS value is now 678 amps. FIG. 8C depicts the resultant current I1a-I6a in the common electrical flange (e.g., electrical flange 204b), which, unlike the situation with FIGS. 7A-7E, is distinctly non-sinusoidal. The waveform of FIG. 8C (I1a-I6a) yields a peak value of 2,000 amps and an RMS value of 1,281 amps. Moreover, if the waveform of FIG. 8B, is shifted 60 degrees as shown in FIG. 8D, the shifted waveform, now designated I5a, (e.g., I5a leads I1a by 60 degrees), I5a still has a peak value of 1,000 amps and an RMS value of 678 amps, but the resultant current I1a-I5a resulting from FIGS. 8A and 8D, illustrated in FIG. 8E, now has a peak value of 1,732 amps and an RMS value of 1,178 amps, very different from the current waveform of FIG. 8C (I1a-I6a). Thus, when the waveforms are cut (e.g., non-sinusoidal), the RMS value of the resultant current in the common conductor is dependent on the phase angle between the two electrical currents. In the present example, simply by shifting the phase angle of the second electrical current from lagging (FIG. 8B) to leading (FIG. 8D), by the same absolute phase angle of 60 degrees relative to the first electrical current I1a, resulted in an RMS current difference of 103 amps between the lagging and leading scenarios.

Figure 9A:
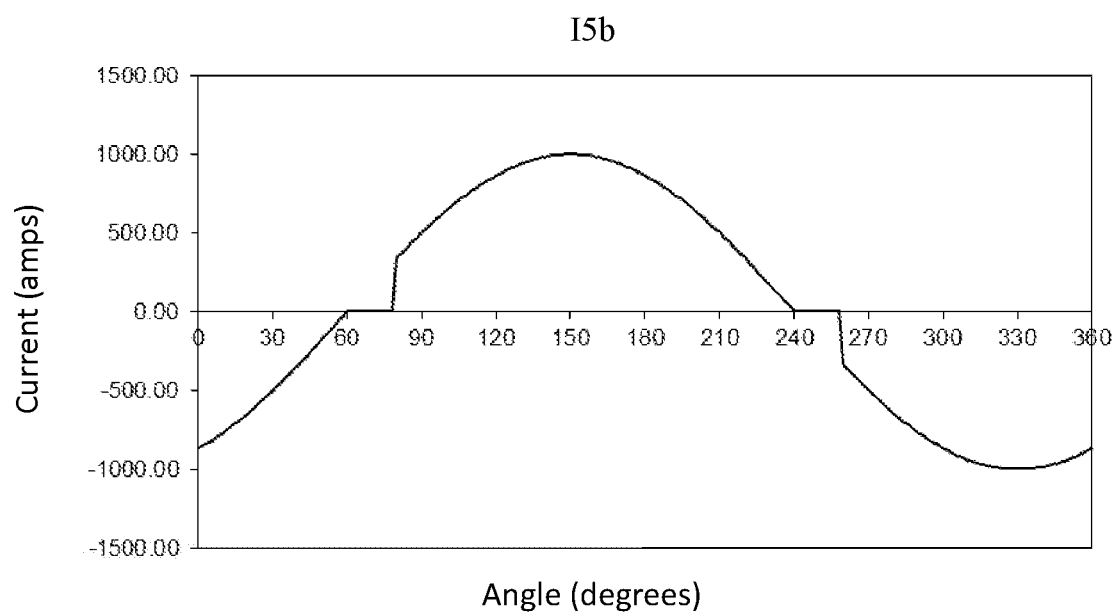
FIG. 9A is a graph of a cut alternating electrical current waveform identical to the alternating electrical current waveform of FIG. 8B except that less of the waveform has been cut.
Figure 9B:
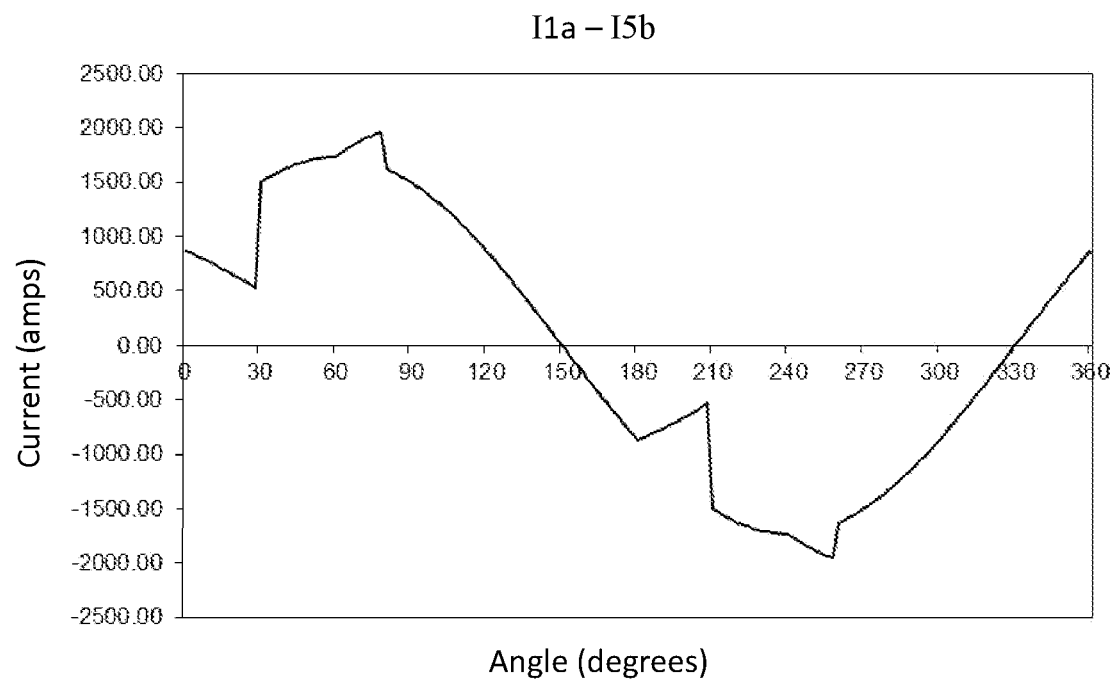
FIG. 9B is a graph showing the resultant alternating electrical current waveform when the cut alternating electrical current waveform of FIG. 8A and the cut alternating electrical current waveform of FIG. 9A are present in the same conductor, such as a common electrical flange.

Now consider a situation where current I1a is established in a first electrical circuit of a direct heated molten glass delivery apparatus with a metallic vessel, and I6a is established in a second, adjacent electrical circuit, there being a common electrical flange between the two electrical circuits that carries both I1a and I6a, and wherein a first portion of the metallic vessel carries I1a and a second portion of the metallic vessel carries I6a. Electrical current I1a is the same as indicated in FIG. 8A, and electrical current I6a is the same as indicated in FIG. 8B. If a temperature increase in the second portion of the metallic vessel is desired, this can be accomplished by changing the firing angle of the phase-fired controller, decreasing the angle at which the phase-fired controller begins conducting and therefore increasing the unblocked portion of the current waveform (decreasing that portion of the waveform that is blocked). For example, by changing the firing angle of the phase-fired controller from 45 degrees to 15 degrees for current I6a, the resultant waveform for I6a is shown in FIG. 9A, now designated as I6b. As can be seen, while the peak value of I6b, 1,000 amps, is the same as I6a, the RMS value of I6b has increased from 678 amps (I6a) to 704 amps, increasing the power to that portion of the metallic vessel comprising the second electrical circuit and thereby increasing the temperature of the metallic vessel portion (and the temperature of the molten glass therein). However, it is also instructive to look at the electrical current I1a-I6b in the common flange carrying both electrical currents I1a and I6b, shown in FIG. 9B. FIG. 9B shows a decrease in the RMS current to 1,186 amps. That is, while the electrical current in that portion of the metallic vessel supplied with I6b has increased 26 amps relative to I6a, the current in the common flange carrying both I1a and I6b (I1a-I6b) has decreased from 1,281 amps to 1,178 amps, a difference of 103 amps because of increased cancellation of the electrical currents (since more of the I6b electrical current waveform is passed by the phase-fired controller). Thus, by selecting the appropriate phase angle between electrical currents in adjacent electrical circuits and the firing angles of the associated phase-fired controllers, a resultant electrical current in the common electrical flange can be produced that does not overheat the common electrical flange, even if the electrical current in an individual circuit is increased.

Figure 10A:
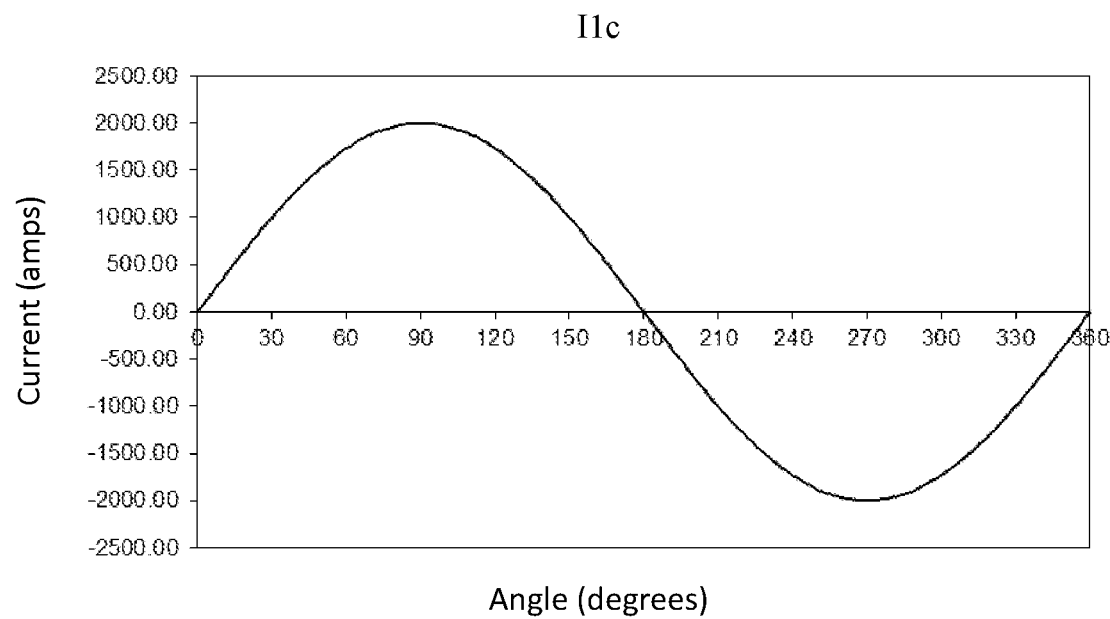
FIG. 10A is a graph of a sinusoidal alternating electrical current waveform in a first electrical circuit identical to the alternating electrical current waveform of FIG. 7A.
Figure 10B:
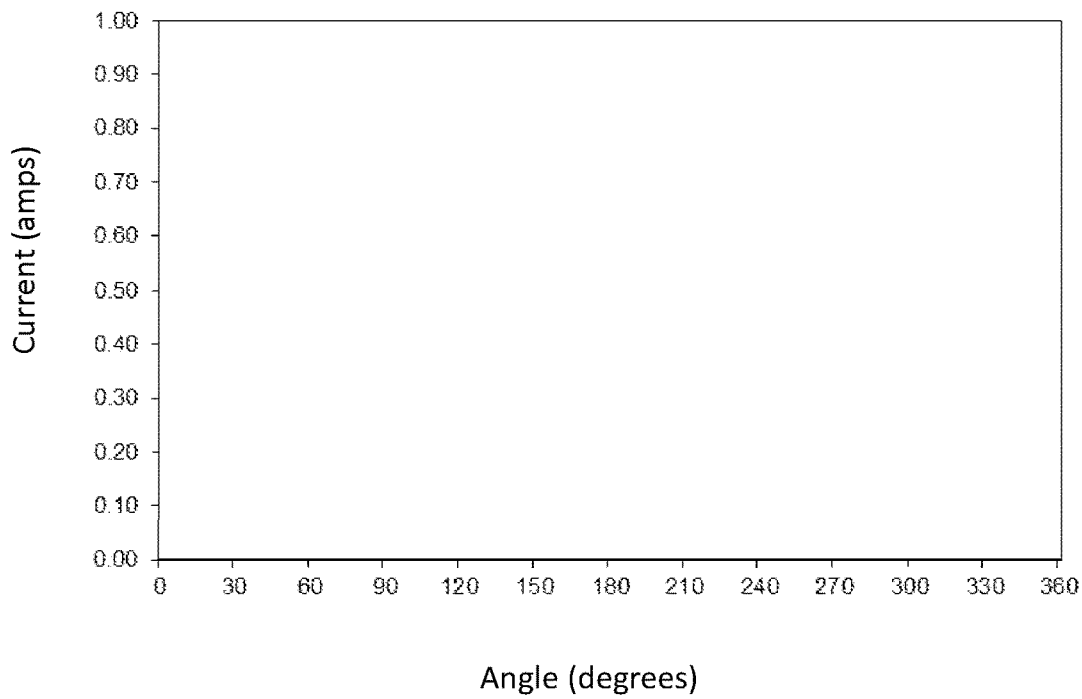
FIG. 10B is a graph showing the resultant alternating electrical current waveform when the alternating electrical current waveform of FIG. 7A and the cut alternating electrical current waveform of FIG. 10A are present in the same conductor, such as a common electrical flange.

It should be apparent that electrical current in the common flange can be modified without a phase angle difference (a phase angle of zero degrees) between the two adjacent electrical circuits by cutting at least one of the electrical current waveforms supplied to one of the two adjacent circuits. This can be seen with the aid of FIGS. 7A and 10A-10C. Recall FIG. 7A depicts a sinusoidal electrical current waveform with a peak of 2000 amps and an RMS value of 1,414 amps. FIG. 10A illustrates an identical electrical current waveform, I1c. Assume the electrical current waveform I1 from FIG. 7A represents the electrical current in a first electrical circuit (e.g., the electrical circuit 218a of FIG. 4B) and the electrical current waveform I1c from FIG. 10A represents the electrical current in a second, adjacent electrical circuit (e.g., the electrical circuit 218b of FIG. 4B), with a peak of 2000 amps and an RMS value of 1,414 amps, wherein the first and second electrical circuits share a common electrical flange. The resultant electrical current in the common electrical flange (e.g., electrical flange 204b) is zero, as shown in FIG. 10B. This is because the first electrical current I1 in the common electrical flange from the first electrical circuit is cancelled by the second electrical current I1c in the common electrical flange from the second electrical circuit.

Figure 10C:
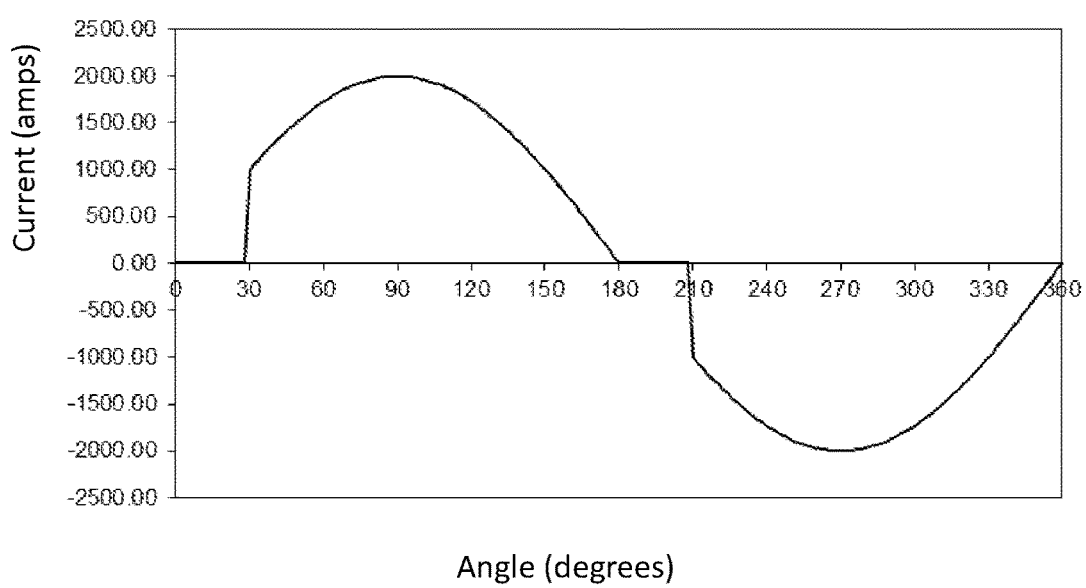
FIG. 10C is a graph of a cut alternating electrical current waveform, similar to the electrical current waveform of FIG. 10A, in a second electrical circuit adjacent the alternating electrical current waveform of FIG. 7A.
Figure 10D:
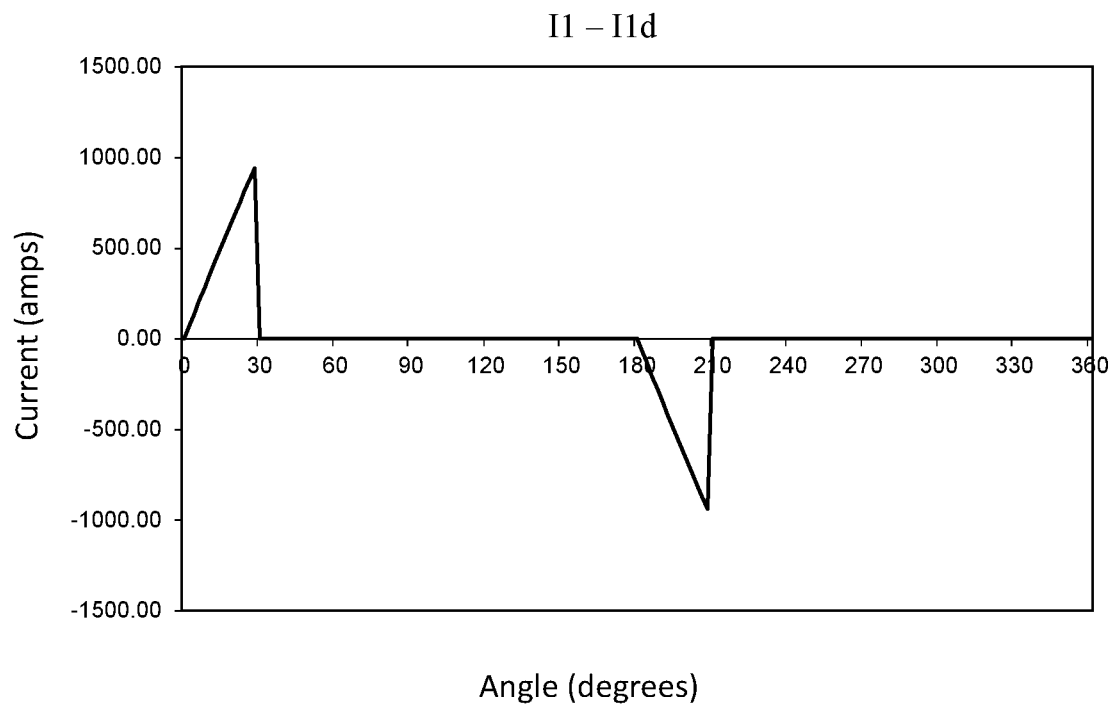
FIG. 10D is a graph showing the resultant alternating electrical current waveform when the alternating electrical current waveform of FIG. 7A and the cut alternating electrical current waveform of FIG. 10C are present in the same conductor, such as a common electrical flange.

Now, assume the electrical current in the second electrical circuit is represented by the electrical current waveform of FIG. 10C, I1d where the first 30 degrees of each one-half cycle of the electrical current waveform from FIG. 10A is blocked, for example by a phase-fired controller. The electrical current in the second electrical circuit comprises a peak of 2,000 amps and an RMS value of 1,396 amps. The resultant electrical current in the common electrical flange is represented by the electrical current waveform shown in FIG. 10D, with a peak of 939 amps and an RMS value of 229 amps.

The preceding example of FIGS. 7A and 10A-10C highlights that for two adjacent electrical circuits, cutting the electrical current waveform in at least one electrical circuit can be used to control the resultant electrical current in a common electrical flange shared by the two adjacent electrical circuits, even if, in the absence of cutting, the two electrical current waveforms are identical and the phase angle between the two electrical currents is zero. By cutting one or both of the electrical current waveforms, the electrical current in the common flange can be controlled. It should be apparent that this concept can be expanded. That is, further control of the resultant electrical current in the common electrical flange can be provided by controlling the peak electrical current in at least one of the first and second electrical circuits. It should be further appreciated that additional adjacent electrical circuits can be added to the basic two-circuit concept just described.

The foregoing discussion and examples show that:
All three line phases of a three-phase power supply can be used to obtain better load balancing;
Transformers can be used to isolate individual circuits from the line supply, increase (or decrease) electrical current in an electrical circuit, and increase the number of available phases. Indeed, one of ordinary skill in the art will appreciate that the use of A-Y transformers can provide a 30-degree phase angle between the primary electrical current and the secondary electrical current, either lagging or leading, depending on the polarity of the secondary windings: and
Phase-fired controllers (e.g., thyristors) can be used to control power in an electrical circuit by blocking portions of the delivered electrical current waveform.

These principles can be used in various combinations to provide predetermined electrical currents, thereby attaining predetermined temperatures to predetermined portions of a metallic vessel arranged in adjacent electrical circuits, and further to provide temperatures in various of the electrical flanges, such as common electrical flanges, that are less than the temperatures of the predetermined portions of the metallic vessel.

For example, although each electrical circuit of FIG. 5A is by itself a single-phase circuit, arrangement of multiple circuits along a length of the metallic vessel utilizing different electrical phases can be used to control not only the current in a predetermined portion of the metallic vessel, but the current in, and temperature of, the common electrical flange between circuits (between heating zones). For example, when an increased temperature within a predetermined portion of a metallic vessel is needed (e.g., within a predetermined heating zone), for example to accommodate a manufacturing process change, the firing angle of the phase-fired controller can be decreased, which will increase the electrical current to the selected portion of the metallic vessel. At the same time, the increased portion of the electrical current waveform passed by the phase-fired controller decreases the electrical current in the common electrical flange by increasing the amount of current cancelling that occurs in the common electrical flange.

Electrical current, and thus heating power, can be controlled by selecting the appropriate transformer taps, the phase angle between adjacent electrical circuits, and the firing angle of a phase-fired controller within the electrical circuits to obtain a desired amount of waveform cutting. Note that the phase arrangement between adjacent electrical circuits and the firing angles for the various electrical circuits will be selected based on the particular apparatus and process conditions.

Using the principals described herein, the temperature of electrical flanges in a glass manufacturing apparatus can be predicted based on calculated electrical current. Such prediction capability can be used, for example, to design a manufacturing system prior to build, or, as alluded to above, accommodate manufacturing process changes, such as an increase or decrease in molten glass flow, numbers of electrical flange, locations and dimension changes, to name a few.

A comprehensive model can be developed that accounts for a range of process variables that can include thickness and thermal conductivity of insulation positioned around the metallic vessel, molten glass flow rate, molten glass viscosity and therefore heating zone temperature needs. The modeling, for example using Ansys R FLUENT, the temperature needs for each heating zone, and the subsequent the electrical current needed in each electrical circuit portion of the metallic vessel to obtain those temperatures, can be obtained. The desired electrical current in the electrical circuit portions of the metallic vessel can then be used to calculate the electrical current in the associated electrical flanges using the superposition method described herein, accounting for both electrical current phase angle and phase-fired controller firing angles.

Figure 11:
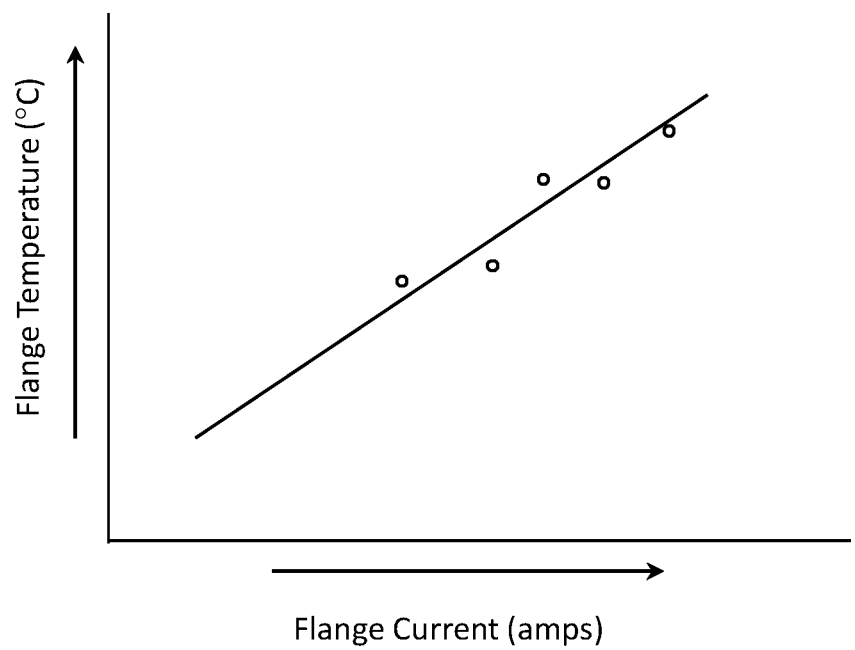
FIG. 11 is a graph of an exemplary regression line depicting electrical flange temperature as a function of electrical current in the flange.

The anticipated temperature of the electrical flanges can be predicted using an empirical calculation. That is, a correlation between electrical flange current and electrical flange temperature can be obtained by measuring temperatures of the electrical flanges under different electrical current conditions, and measuring various electrical parameters (e.g., electrical current, voltage and impedance) for each condition. A regression (an idealized representation of a regression is shown in FIG. 11) can be calculated that associates a predetermined electrical current within each electrical flange with a resultant temperature.

An equivalent electrical circuit can be developed (as shown in FIG. 4B for example), which, using superposition, can be used to calculate a predicted electrical flange current for a set of predetermined conditions (e.g., electrical power supply parameters, current phase angles, firing angles, and impedances). The calculation can be tuned by adjusting the equivalent electrical circuit impedances to provide results that comport with the empirical results.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A method of heating a metallic vessel, comprising:
    flowing molten glass through the metallic vessel, the metallic vessel comprising a plurality of electrical flanges attached to the metallic vessel, the plurality of electrical flanges comprising at least a first electrical flange, a second electrical flange spaced apart from the first electrical flange, and a third electrical flange spaced apart from the second electrical flange, the first electrical flange, the second electrical flange, and the third electrical flange arranged sequentially along a length of the metallic vessel, wherein the first electrical flange, the second electrical flange, and a first portion of the metallic vessel therebetween comprise a first electrical circuit, wherein the second electrical flange, the third electrical flange and a second portion of the metallic vessel between the second electrical flange and the third electrical flange comprise a second electrical circuit, and wherein the second electrical flange forms a common electrical path for the first electrical circuit and the second electrical circuit;
    establishing a first alternating electrical current in the first electrical circuit and establishing a second alternating electrical current in the second electrical circuit with a first phase angle relative to the first alternating electrical current;
    controlling an electrical power dissipated in at least one of the first portion of the metallic vessel or the second portion of the metallic vessel by cutting at least one of the first alternating electrical current or the second alternating electrical current during each one-half cycle of the respective at least one first alternating electrical current or second alternating electrical current; and
    wherein a temperature of the second electrical flange is less than a temperature of the first portion and the second portion.

2. The method according to claim 1, wherein an absolute value of the first phase angle is one of 0 degrees, 30 degrees, 60 degrees, or 120 degrees.

3. The method according to claim 1, wherein the metallic vessel comprises a fourth electrical flange spaced apart from and sequential to the first, second, and third electrical flanges, the third electrical flange, the fourth electrical flange, and a third portion of the metallic vessel extending between the third electrical flange and the fourth electrical flange comprising a third electrical circuit, such that the third electrical flange provides a common electrical path for the second electrical circuit and the third electrical circuit, the method further comprising establishing a third alternating electrical current in the third electrical circuit with a second phase angle relative to the first alternating electrical current and a third phase angle relative to the second alternating electrical current.

4. The method according to claim 3, wherein an absolute value of the second phase angle is one of 0 degrees, 30 degrees, 60 degrees, or 120 degrees.

5. The method according to claim 4, wherein the absolute value of the second phase angle is equal to an absolute value of the first phase angle.

6. The method according to claim 3, wherein an absolute value of the third phase angle is one of 0 degrees, 30 degrees, 60 degrees, or 120 degrees.

7. The method according to claim 6, wherein the absolute value of the third phase angle is equal to an absolute value of the first phase angle.

8. The method according to claim 3, wherein the first and second phase angles are non-zero, and a sign of the first phase angle is different than a sign of the second phase angle.

9. The method according to claim 1, wherein the first alternating electrical current and the second alternating electrical current are provided by a first transformer and a second transformer, respectively.

10. The method according to claim 3, wherein the third alternating electrical current is provided by a third transformer.

11. The method according to claim 1, wherein the cutting comprises blocking the at least one of the first alternating electrical current and the second alternating electrical current during each one-half cycle of the respective at least one first alternating electrical current or second alternating electrical current with a phase-fired controller.

12. The method according to claim 1, wherein the metallic vessel comprises a fining chamber.

13. The method according to claim 1, further comprising supplying a forming body with the molten glass and drawing the molten glass from the forming body.

14. The method according to claim 13, further comprising drawing the molten glass into a ribbon of glass.

15. A method of heating a metallic vessel, comprising:
    flowing molten glass through the metallic vessel, the metallic vessel comprising n electrical flanges attached to the metallic vessel along a length thereof, the n electrical flanges forming n−1 electrical circuits, each of the n−1 electrical circuits including two adjacent flanges of the n electrical flanges and a respective portion of the metallic vessel therebetween, wherein adjacent circuits of the n−1 electrical circuits include an electrical flange of the n electrical flanges that forms a common electrical path to the adjacent electrical circuits, and wherein n is equal to or greater than 3;

establishing an alternating electrical current in each electrical circuit of the n−1 electrical circuits;

controlling a power dissipated in at least one portion of the metallic vessel comprising the n−1 electrical circuits by cutting the alternating electrical current supplied to the corresponding electrical circuit during each one-half cycle of the alternating electrical current in the corresponding electrical circuit; and wherein a temperature of each of the n electrical flanges is less than a temperature of the at least one portion.

16. The method according to claim 15, wherein n is equal to or greater than 4.

17. The method according to claim 15, wherein an absolute value of a phase angle between at least two of the n−1 electrical currents is one of 0 degrees, 30 degrees, 60 degrees, or 120 degrees.

18. The method according to claim 15, further comprising cutting the alternating electrical current supplied to each of the n−1 electrical circuits.

19. The method according to claim 15, wherein the metallic vessel comprises platinum.

20. The method according to claim 15, wherein the metallic vessel comprises a fining chamber.

* * * * *